United States Patent
Aita et al.

(10) Patent No.: US 9,727,362 B2
(45) Date of Patent: Aug. 8, 2017

(54) EXECUTION CONTROL METHOD, STORAGE MEDIUM, AND EXECUTION CONTROL APPARATUS

(71) Applicant: FUJITSU LIMITED, Kawasaki-shi, Kanagawa (JP)

(72) Inventors: Satoshi Aita, Kawasaki (JP); Yuji Wada, Ota (JP); Kuniaki Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 633 days.

(21) Appl. No.: 14/224,518

(22) Filed: Mar. 25, 2014

(65) Prior Publication Data

US 2014/0297778 A1   Oct. 2, 2014

(30) Foreign Application Priority Data

Mar. 28, 2013   (JP) ................................. 2013-070410

(51) Int. Cl.
*G06F 15/167*   (2006.01)
*G06F 9/455*   (2006.01)
*G06F 9/48*   (2006.01)

(52) U.S. Cl.
CPC ........ *G06F 9/45558* (2013.01); *G06F 9/4856* (2013.01); *G06F 2009/4557* (2013.01)

(58) Field of Classification Search
CPC ......... G06F 2009/4557; G06F 9/45558; G06F 9/4856
See application file for complete search history.

(56) References Cited

U.S. PATENT DOCUMENTS

| 6,041,420 A | * | 3/2000 | Skarpelos | G06F 11/1474 714/6.32 |
| 8,886,995 B1 | * | 11/2014 | Pallapothu | G06F 11/1471 714/15 |
| 2009/0138752 A1 | * | 5/2009 | Graham | G06F 11/1484 714/4.1 |

(Continued)

FOREIGN PATENT DOCUMENTS

| JP | 2000-137603 | 5/2000 |
| JP | 2000-242540 | 9/2000 |
| JP | 2007-334777 | 12/2007 |

*Primary Examiner* — Oscar Louie
*Assistant Examiner* — James Forman
(74) *Attorney, Agent, or Firm* — Staas & Halsey LLP

(57) ABSTRACT

An execution control method performed by a processor includes storing a first plurality of commands executed in the first computer and a first execution order in a memory; executing the first plurality of commands according to the first execution order when executed on the third computer; storing a second plurality of commands executed in the second computer and a second execution order in the memory; executing the second plurality of commands according to the second execution order when executed on the fourth computer; storing information generated by executing a command among the first plurality of commands and the second plurality of commands in the memory as configuration information each time the command is executed; and selecting a command among a first earliest command among unexecuted commands of the first plurality of commands and a second earliest command among unexecuted commands of the first plurality of commands, and executing the command.

10 Claims, 18 Drawing Sheets

(56) References Cited

U.S. PATENT DOCUMENTS

| | | | |
|---|---|---|---|
| 2011/0035726 A1* | 2/2011 | Davies | G06F 8/71 717/110 |
| 2011/0093849 A1* | 4/2011 | Chawla | H04L 41/0816 718/1 |
| 2014/0129808 A1* | 5/2014 | Naveh | G06F 9/4856 712/225 |

* cited by examiner

FIG. 4

```
        COMMAND PROPERTY    ~220
              DB
```

| COMMAND NAME | ARGUMENT NUMBER/OPTION | ARGUMENT/OPTION PROPERTY |
|---|---|---|
| mkdir | 1 | output file |
| ssh | keygen | - |
| ssh | t | - |
| scp | 1 | input file |
| scp | 2 | output file |
| cp | 1 | input file |
| cp | 2 | output file |
| mysql | -u | input String |
| mysql | -p | input String |
| echo | 1 | output String |
| ⋮ | ⋮ | ⋮ |

400-1 → mkdir row
400-2 → ssh row
400-10 → echo row

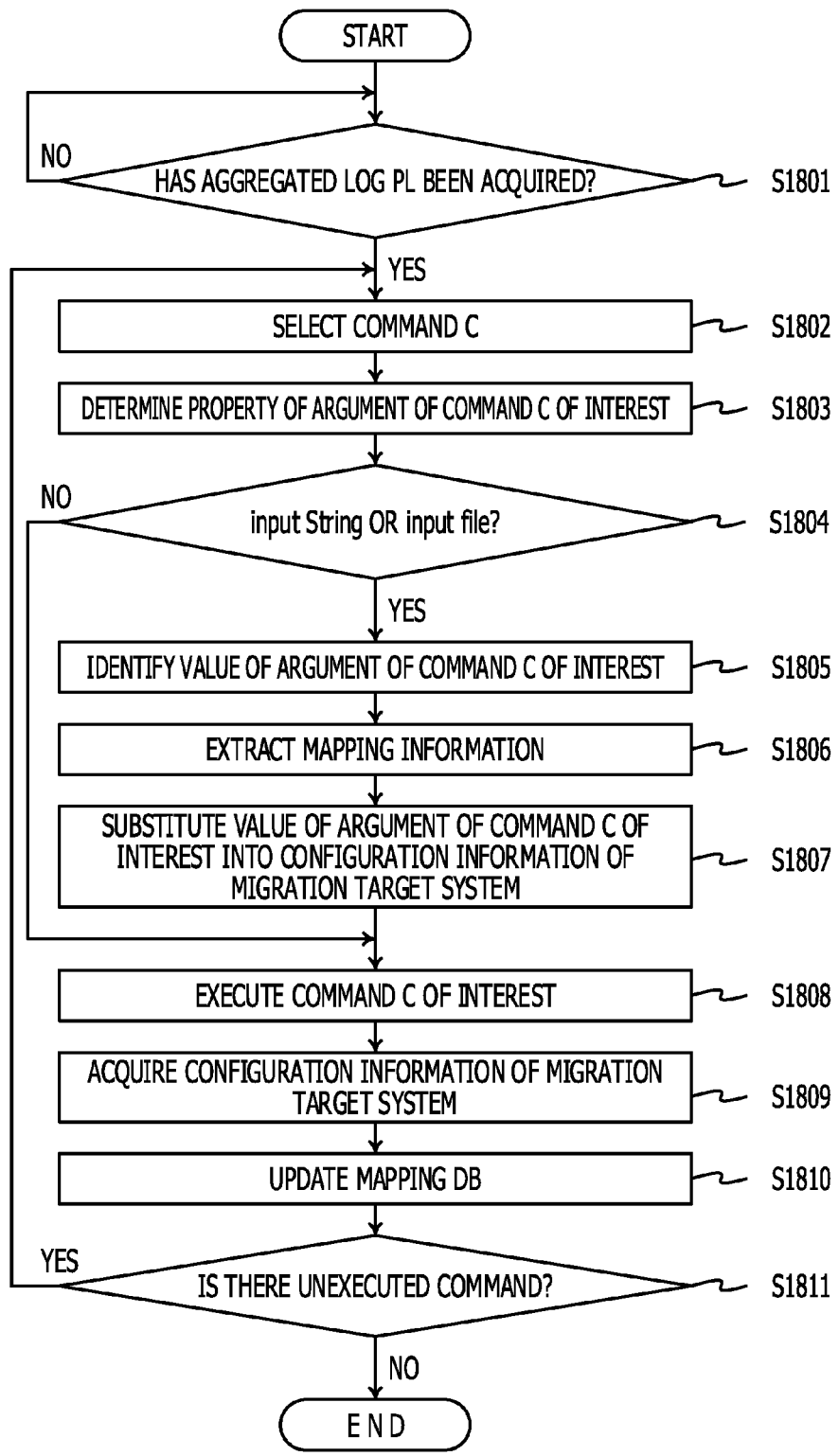

EXECUTION CONTROL METHOD, STORAGE MEDIUM, AND EXECUTION CONTROL APPARATUS

CROSS-REFERENCE TO RELATED APPLICATION

This application is based upon and claims the benefit of priority of the prior Japanese Patent Application No. 2013-070410, filed on Mar. 28, 2013, the entire contents of which are incorporated herein by reference.

FIELD

The embodiments discussed herein are related to an execution control method, storage medium, and an execution control apparatus.

BACKGROUND

In recent years, there have been an increasingly greater number of providers that provide cloud service, which accordingly results in more opportunities to migrate systems. One known method of migrating a system is to rebuild the system. When commands are executed to make various settings of a server during a process of building a system, a system build log is stored so as to indicate the commands in the order of their execution. When the system is rebuilt, the commands are automatically executed on the server according to the system build log.

Related arts include, for example, a technique in which when an application program is produced by integrating a plurality of software components, the order of generating software components is determined based on information specifying a software component used by each software component of the plurality of software components. Descriptions of related arts may be found, for example, in Japanese Laid-open Patent Publication No. 2000-137603 and the like.

However, in the related arts, the system build log is stored separately for each server. Therefore, in a case where a system including a plurality of servers is rebuilt, it is difficult to execute commands according to the system build logs of the respective servers taking into account a dependency relationship among the servers in terms of the order of execution. To handle the above situation, it may be possible to manually execute commands on the respective servers taking into account the dependency relationship among the servers in terms of the order of execution, which results in an increase in load on a human operator who does a work to rebuild the system.

In a case where each system build log includes a description of time (timestamp) at which each command was executed, it may be possible to determine the order of executing the commands from the timestamps. However, it may not be guaranteed that synchronization in terms of time is achieved among servers. Besides, in some cases, a system build log includes no description of timestamps. For example, there is a possibility that a timestamp is not described in a default history log or a log of commands executed in background.

SUMMARY

According to an aspect of the invention, an execution control method performed by a processor in migrating a system including a first computer and a second computer to a target system including a third computer and a fourth computer, the execution control method includes storing a first plurality of commands executed in the first computer and a first execution order of the first plurality of commands, the first execution order indicating an execution order according to which the first plurality of commands are to be executed on the third computer; storing a second plurality of commands executed in the second computer and a second execution order of the second plurality of commands, the second execution order indicating an execution order according to which the second plurality of commands are to be executed on the fourth computer; storing configuration information generated by executing commands among the first plurality of commands and the second plurality of commands, the configuration information used to execute unexecuted commands among the first plurality of commands and the second plurality of commands; selecting, using the stored configuration information, a command which is executable on the target system from a first earliest command that is at an earliest position in the first execution order among unexecuted commands of the first plurality of commands on the third computer and a second earliest command that is at an earliest position in the second execution order among unexecuted commands of the second plurality of commands on the fourth computer; and executing the selected command.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a storage content of a command property database;

FIG. 18 is a flow chart illustrating an example of a second execution control process procedure performed by an execution control apparatus.

DESCRIPTION OF EMBODIMENTS

A storage medium, an execution control method, and a network system according to embodiments of the present disclosure are described below in detail with reference to drawings.

Figure 1:
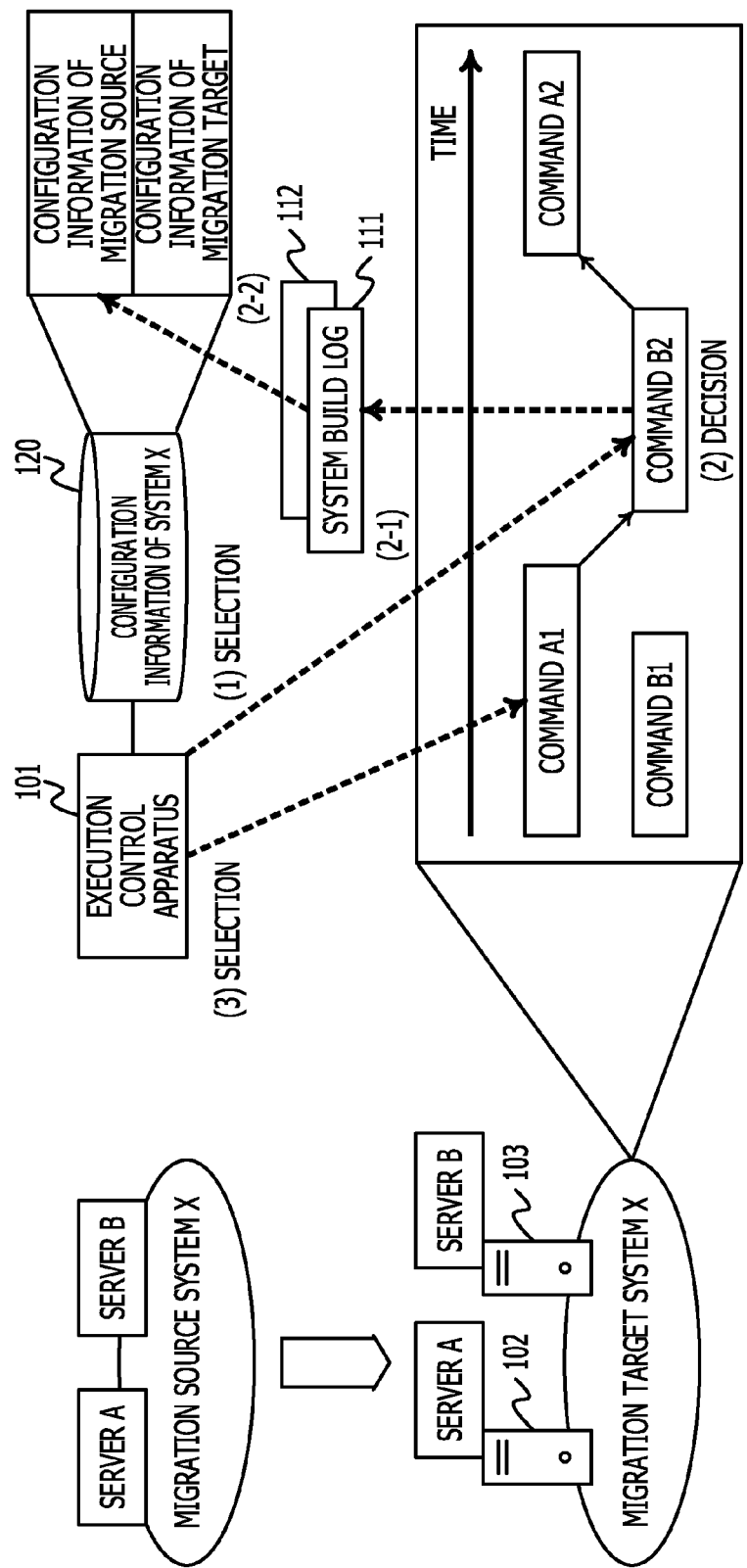
FIG. 1 is a diagram illustrating an example of a control method according to an embodiment.

FIG. 1 is a diagram illustrating an example of a control method according to an embodiment. In FIG. 1, an execution control apparatus 101 is a computer that controls execution of commands when the commands are executed to build a system. The system is built using a plurality of information processing apparatuses (for example, information processing apparatuses 102 and 103).

Each information processing apparatus is a computer that includes an operating system (OS) installed therein for realizing the system, and that operates to make various settings in building the system. The commands are used to make various settings of the information processing apparatuses when the system is built. More specifically, for example, the commands are used to set the OS, produce a folder, produce a file, and the like.

In the following discussion, it is assumed that a migration of a system X including a server α and server β is performed. Furthermore it is also assumed that in a migration target system X, functions of the server α are realized by an information processing apparatus 102, and functions of the server β are realized by an information processing apparatus 103. It is further assumed that when a system X is built, a command A1 and a command A2 are executed by the information processing apparatus 102, and a command B1 and a command B2 are executed by the information processing apparatus 103.

The command B2 is a command to be executed after the command A1 is executed by the information processing apparatus 102. The command A2 is a command to be executed after the command B2 is executed by the information processing apparatus 103. That is, the order of executing the commands depends on the relationship between the information processing apparatuses 102 and 103.

In this regard, if the commands A1 and A2 and the commands B1 and B2 are executed independently by the respective information processing apparatuses 102 and 103, then there is a possibility that the command B2 is executed by the information processing apparatus 103 before the command A1 is executed by the information processing apparatus 102. In this case, there is a possibility that when the command B2 is executed, there is no information supposed to be used in the execution of the command B2, which may make it difficult to execute the command B2 correctly.

In the present embodiment, to handle the above-described situation, the execution control apparatus 101 makes a judgment, from a property of an argument of each command to be executed by each information processing apparatus when the system X is built, as to whether the command has a dependency relationship in terms of the order of execution between information processing apparatuses. In a case where the judgment made is that there is a dependency relationship in terms of the order of execution between the information processing apparatuses, the execution control apparatus 101 determines whether or not to allow it to execute the command based on a correspondence between configuration information of the migration source of the system X and configuration information of the migration target. An example of an execution control process performed by the execution control apparatus 101 is described below.

(1) The execution control apparatus 101 selects a command to be executed from a set of commands to be executed on either one of the information processing apparatuses 102 and 103 when the system X is built. Hereinafter, a selected command to be executed will also be referred to as a command of interest. Note that, it may be possible to identify sets of commands to be executed on the respective information processing apparatuses 102 and 103 based on, for example, system build logs 111 and 112. The system build logs 111 and 112 are information indicating, in the order of execution, commands executed on the respective information processing apparatuses 102 and 103 when the migration source of the system X is built.

More specifically, for example, the execution control apparatus 101 refers to the system build log 112 associated with the information processing apparatus 103 and selects commands, in the order of execution, from the set of commands to be executed on the information processing apparatus 103. Herein, let it be assumed that the command B2 is selected as a command of interest to be executed on the information processing apparatus 103. In this situation, let it be further assumed that the command B1 has already been executed.

(2) The execution control apparatus 101 determines whether or not to allow it to execute the selected command based on a property of an argument of the selected command and the configuration information 120 of the system X. Note that the configuration information 120 of the system X is information indicating the configuration information of the migration source in relation to the configuration information of the migration target.

The configuration information of the migration source is configuration information of the system X built in the migration source. The configuration information of the migration target is configuration information of the system X being currently built in the migration target, and the configuration information of the migration target is updated during the process of building the system X. The configuration information may include, for example, information indicating Internet protocol (IP) addresses of the respective servers α and β, and information indicating paths of files, folders, and the like generated by the respective servers α and β.

The property of the argument indicates an effect of a value given as the argument on an execution of the command. More specifically, examples of properties of arguments are a property that a value given as an argument is associated with information that is input when a command is executed, a property that a value given as an argument is associated with information that is output when a command is executed, and the like.

There is a possibility that there is no information supposed to be input when a command is executed in a case where another command has not yet been executed. In the case where there is no information supposed to be input when a command is executed, this command may not be executed correctly. To handle the above situation, for example, in a case where an argument of a command to be executed is associated with information that is input when this command is executed, the execution control apparatus 101 determines whether or not to allow this command to be executed.

More specifically, for example, the execution control apparatus 101 first refers to the system build log 112 to identify a value of an argument of the command B2 described in the log corresponding to the command B2. That is, the execution control apparatus 101 identifies the value of the argument given to the command B2 when the migration source of the system X is built (see (2-1) in FIG. 1).

Next, the execution control apparatus 101 refers to the configuration information 120 of the system X to identify configuration information of the migration source in which the value of the argument of the command B2 is set. Thereafter, the execution control apparatus 101 judges whether there is configuration information of the migration target corresponding to the configuration information of the migration source (see (2-2) in FIG. 1). That is, the execution control apparatus 101 judges whether there is a value of the argument of the command B2.

In this situation, in a case where there is no configuration information of the migration target, the execution control apparatus 101 determines that it is not allowed to execute the command B2 of interest. That is, the execution control apparatus 101 judges that there is no value of the argument to be used in the execution of the command B2 of interest and thus determines that it is not allowed to execute the command B2 of interest.

On the other hand, in a case where there is configuration information of the migration target, the execution control apparatus 101 determines that it is allowed to execute the command B2 of interest. That is, the execution control apparatus 101 judges that there is a value of the argument to be used in the execution of the command B2 of interest, and thus determines that it is allowed to execute the command B2 of interest. In this case, the execution control apparatus 101 executes the command B2 of interest on the information processing apparatus 103.

In the following discussion, by way of example, it is assumed in the above situation that there is no configuration information of the migration target which corresponds to the configuration information of the migration source and in which the value given as the argument of the command B2 when the migration source of the system X is built is set. That is, the following discussion is made for a case where there is no value to be used in executing the command B2. Thus, the execution control apparatus 101 determines that it is not allowed to execute the command B2 of interest.

(3) In the case where the execution control apparatus 101 determines that it is not allowed to execute the command B2 of interest, the execution control apparatus 101 selects a command to be executed from a set of commands to be executed on the information processing apparatus 102 different from the information processing apparatus 103. More specifically, for example, the execution control apparatus 101 refers to the system build log 111 of the information processing apparatus 103 and selects commands, in the order of execution, from the set of commands to be executed on the information processing apparatus 103.

Thereafter, the execution control apparatus 101 repeats the process (2) and the process (3) for commands selected one by one.

As described above, when the migration target system X is built, the execution control apparatus 101 is capable of executing commands taking into account the dependency relationship in terms of the order of execution between the information processing apparatuses 102 and 103. Thus, without using a manual operation, it is possible to execute commands on the respective information processing apparatuses 102 and 103 taking into account the dependency relationship in terms of the order of execution between the information processing apparatuses 102 and 103, which result in a reduction in a load associated with the operation of building the system.

Next, a description is given below as to an example of a system configuration of a network system 200 according to an embodiment. An information processing apparatus 201 illustrated in FIG. 2 corresponds to the information processing apparatus 102 or 103 illustrated in FIG. 1.

Figure 2:
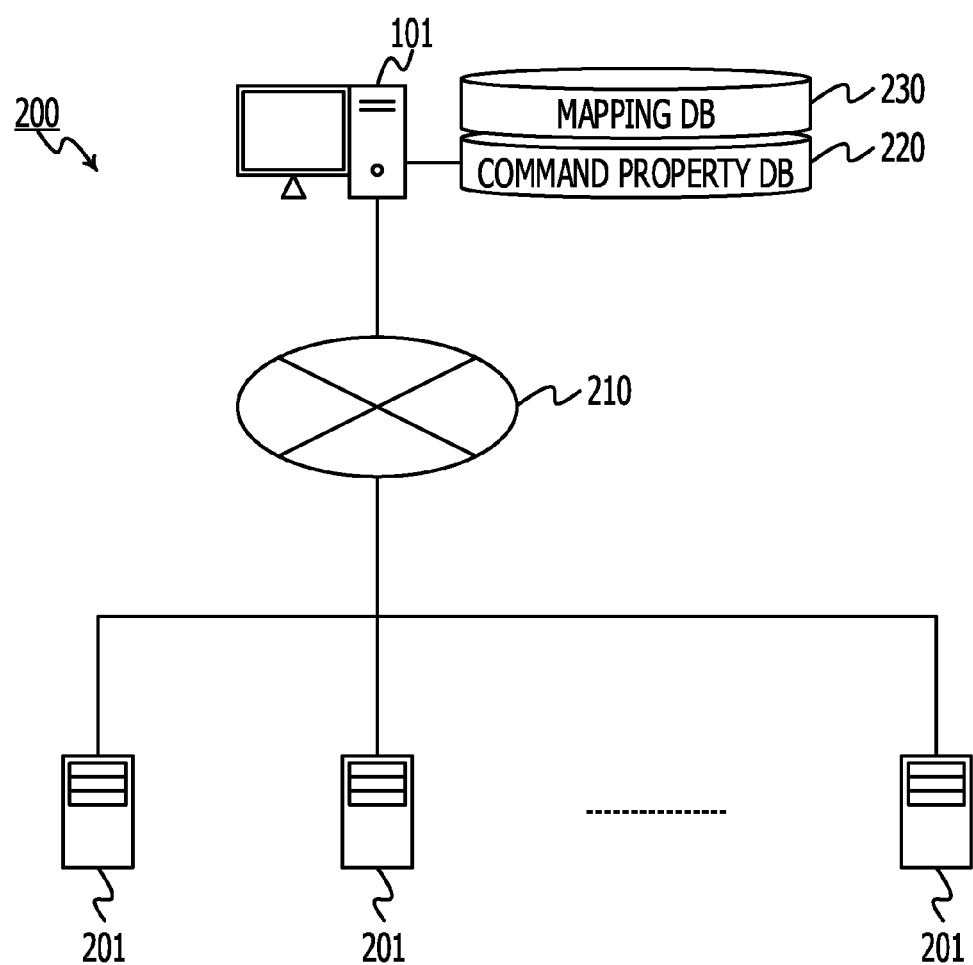
FIG. 2 is a diagram illustrating an example of a system configuration of a network system.

FIG. 2 illustrates an example of a system configuration of the network system 200. In FIG. 2, the network system 200 includes an execution control apparatus 101 and a plurality of information processing apparatuses 201. In the network system 200, the execution control apparatus 101 and the information processing apparatuses 201 are connected to each other via wired or wireless network 210. The network 210 may be, for example, a local area network (LAN), a wide area network (WAN), the Internet, or the like.

The execution control apparatus 101 includes a command property database (DB) 220 and a mapping database 230, and the execution control apparatus 101 controls executing of commands when the commands are executed to build a system. As to a storage content of the command property database 220, an explanation will be given later with reference to FIG. 4. As to a storage content of the mapping database 230, an explanation will be given later with reference to FIG. 5.

The information processing apparatus 201 is a computer configured to be capable of virtualizing hardware resources of the information processing apparatus 201 so as to allow a plurality of different OSs to be executed. The hardware resources of the information processing apparatus 201 may include, for example, a central processing unit (CPU), a memory, an interface (I/F), and the like of the information processing apparatus 201.

More specifically, for example, the information processing apparatus 201 is capable of running an OS on a virtual machine (VM) operating in an execution environment built using divided hardware resources of the information processing apparatus 201. Note that the virtual machine VM is a virtual computer that operates in an execution environment that is built by dividing the hardware resources of the information processing apparatus 201. Entities of the virtual machine VM include, for example, software such as a program or an OS, a variable given to the software, and information specifying a hardware resource used to execute the software.

In the network system 200, it is possible to run a plurality of virtual machines VM on one or more information processing apparatuses 201 to build a system. More specifically, for example, the information processing apparatus 201 may store an image in which an OS and a secure shell (SSH) are installed, and servers α, β, and γ, which are described later, are realized by the plurality of virtual machines VM running on the information processing apparatus 201.

In the network system 200, configuration information of the system built using the plurality of virtual machines VM or the like is managed using, for example, a not-illustrated configuration management database (CMDB) accessible by the execution control apparatus 101.

Figure 3:
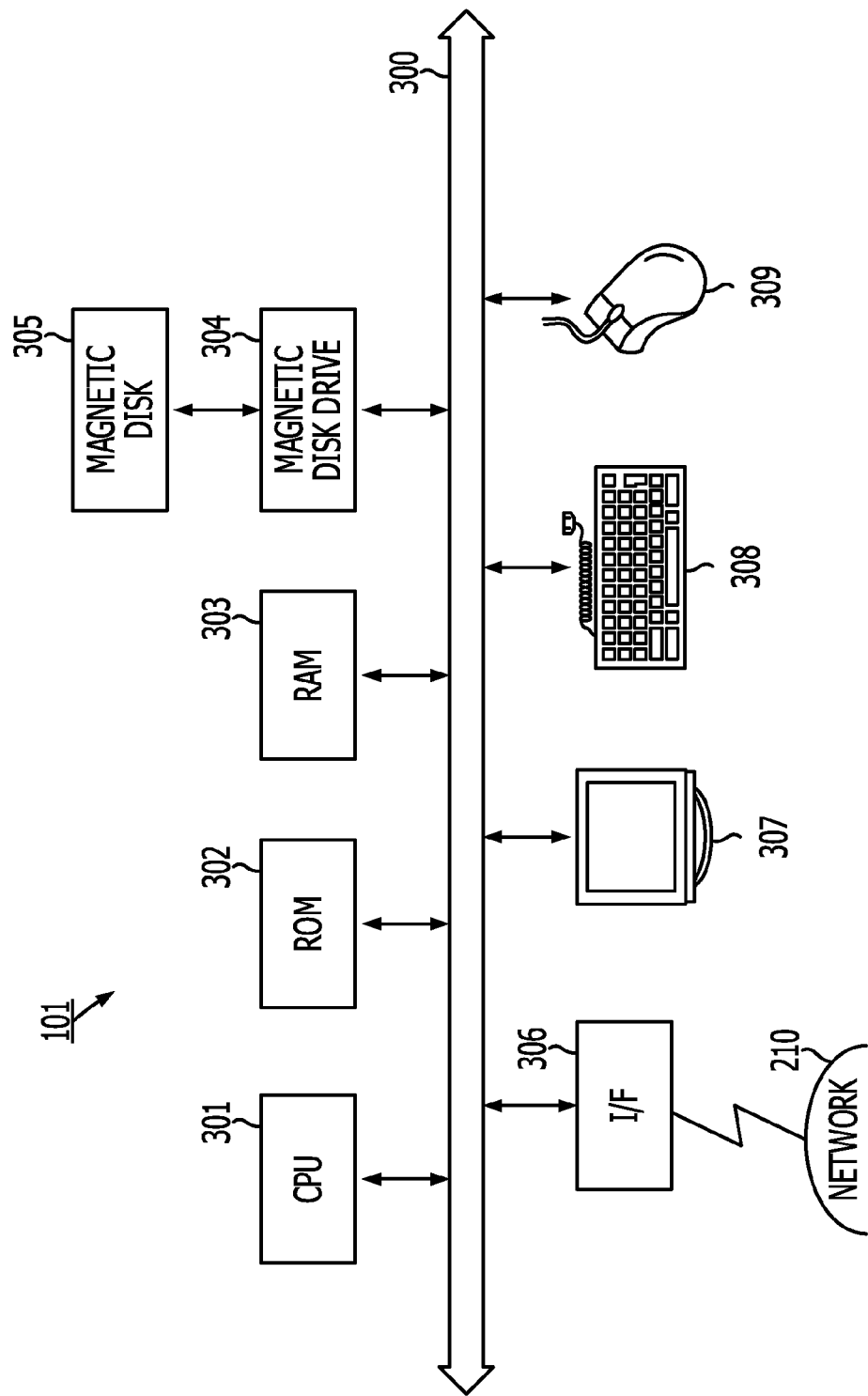
FIG. 3 is a block diagram illustrating an example of a hardware configuration of an execution control apparatus.

FIG. 3 is a block diagram illustrating an example of a hardware configuration of the execution control apparatus 101. In FIG. 3, the execution control apparatus 101 includes a CPU 301, a read-only memory (ROM) 302, a random access memory (RAM) 303, a magnetic disk drive 304, a magnetic disk 305, an interface (I/F) 306, a display 307, a keyboard 308, and a mouse 309. These component units are connected to each other via a bus 300.

The CPU 301 controls the whole execution control apparatus 101. The ROM 302 stores a program such as a boot program. The RAM 303 is used as a work area by the CPU 301. The magnetic disk drive 304 controls, under the control of the CPU 301, reading/writing data from/to the magnetic disk 305. The magnetic disk 305 stores data written under the control of the magnetic disk drive 304.

The I/F 306 is connected to the network 210 via a communication line and further to another apparatus via the network 210. The I/F 306 is an interface between the network 210 and the inside of the execution control apparatus 101 and controls inputting/outputting data from/to an external apparatus. The I/F 306 may be, for example, a modem, a LAN adapter, or the like.

The display 307 displays a cursor, an icon, a toolbox, a document, an image, data of function information, and/or the like. The display 307 may be, for example, a CRT, a TFT liquid crystal display, a plasma display, or the like.

The keyboard 308 includes keys for use to input characters, numerals, and various commands, and is used to input data. Alternatively, as for a unit for inputting data, an input pad of a touch panel type, a ten-key pad or the like may be used. The mouse 309 is used to move the cursor, select an area, move a window, change the size of a window, and the like.

The execution control apparatus 101 may not include some of the component units described above. For example, the execution control apparatus 101 may not include the display 307, the keyboard 308, the mouse 309, or the like. Note that the information processing apparatus 201 illustrated in FIG. 2 may also be realized with a hardware configuration similar to that of the execution control apparatus 101.

Next, an explanation is given below as to contents stored in the command property database 220 illustrated in FIG. 2. The command property database 220 is stored in a storage apparatus, and more specifically, for example, in the ROM 302, the RAM 303, the magnetic disk 305, or the like.

FIG. 4 is a diagram illustrating an example of a storage content of the command property database 220. In FIG. 4, the command property database 220 includes fields of a command name, an argument number/option, and an argument/option property. In the command property database 220, information is described in each field and property information (for example, property information 400-1 to property information 400-10) is stored as a record.

The command name is an identifier identifying a command (shell script) that is executed when a system is built. The argument number/option is an identifier identifying an argument/option of a command. The argument number indicates an ordinal position of an argument within a sequence of arguments of a command. The argument/option property indicates a property of an argument/option.

A property "input String" indicates that an argument/option is information (for example, a password) that is input when a command is executed. A property "output String" indicates that an argument/option is information that is output when a command is executed. A property "input file" indicates that an argument/option is information specifying a file that is input when a command is executed. In the present embodiment, for convenience, directories are also regarded as files. A property "output file" indicates that an argument/option is information indicating a file that is output when a command is executed. A property "-" indicates that no property is defined for an argument/option.

More specifically, for example, property information 400-1 indicates that a property of a first argument of a command "mkdir" is "output file". The command "mkdir" is a command to generate a folder at a specified location. Property information 400-2 indicates that a property of an option "keygen" of a command "ssh" is "-".

Next, a storage content of the mapping database 230 illustrated in FIG. 2 is explained below. The mapping database 230 is realized by a storage apparatus, and more specifically, for example, by the RAM 303, the magnetic disk 305, or the like illustrated in FIG. 3. The configuration information 120 of the system X illustrated in FIG. 1 corresponds to, for example, the mapping database 230.

Figure 5:
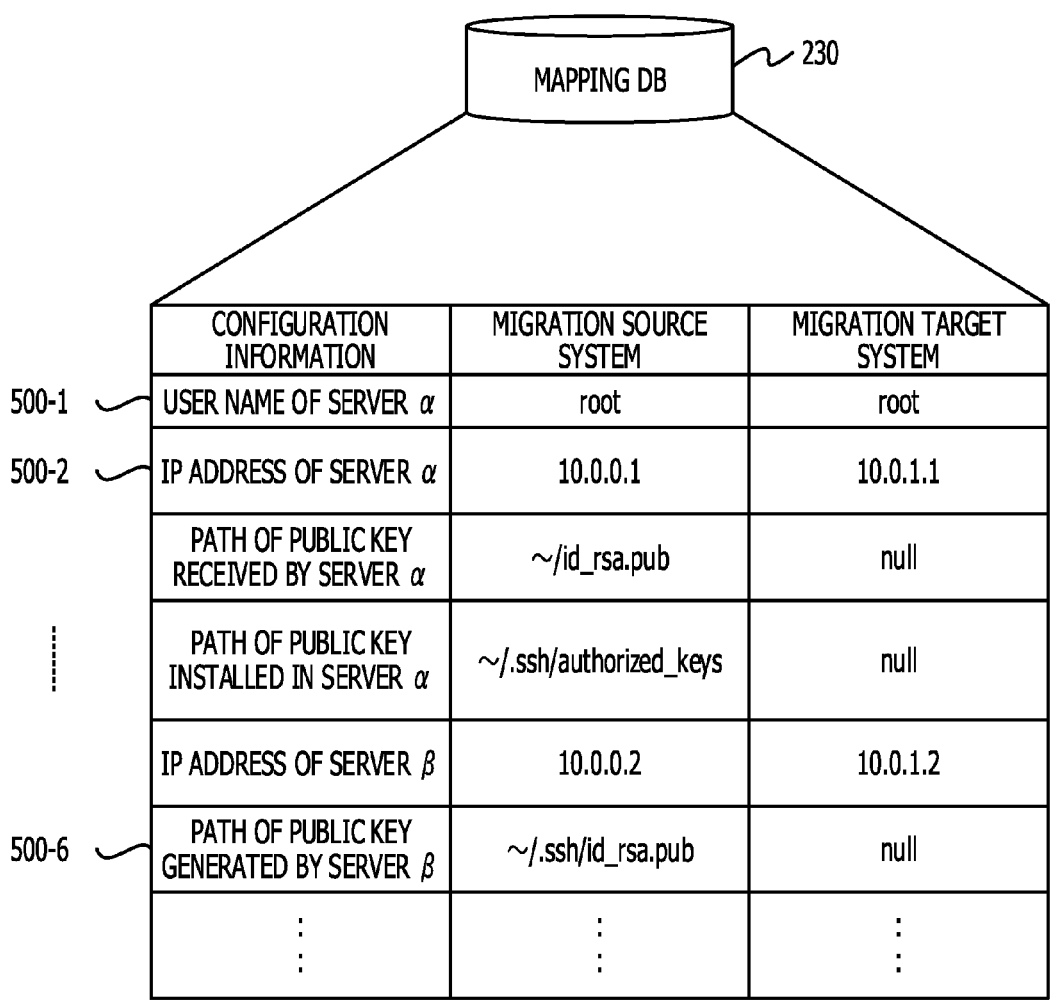
FIG. 5 is a diagram illustrating an example of a storage content of a mapping database.

FIG. 5 is a diagram illustrating an example of a content of the mapping database 230. In FIG. 5, the mapping database 230 includes a field of configuration information, a field of a migration source system, and a field of a migration target system. In the mapping database 230, information is described in each field and mapping information (mapping information 500-1 to mapping information 500-6) is stored as a record.

In this mapping database 230, the configuration information field describes a configuration of a system. The migration source system field describes configuration information of the migration source system. In the present example, in the initial setting, all items of configuration information of the migration source system have been set. The configuration information of the migration source system may be acquired, for example, from a CMDB that manages configuration items of the migration source system.

The migration target system field describes configuration information of the migration target system that is being currently built. In the present example, in initial setting, a user name of a server α, an IP address of the server α, and an IP address of a server β have been set. The configuration information of the migration target system may be acquired, for example, from the CMDB that manages configuration items of the migration target system.

For example, mapping information 500-1 indicates that the user name of the server α of the migration source system is "root", and the user name of the server α of the migration target system is "root", and indicates that they correspond to each other. Mapping information 500-2 indicates that the IP address of the server α in the migration source system is 10.0.0.1, the IP address of the server β in the migration target system is 10.0.1.1, and they correspond to each other.

Next a specific example of a system build log L is explained below. The system build log L is information indicating, in the order of execution, commands executed on each server (for example, each of the server α and server β) in the system when the system is built. The system build logs 111 and 112 illustrated in FIG. 1 are examples of system build logs L.

Figure 6:
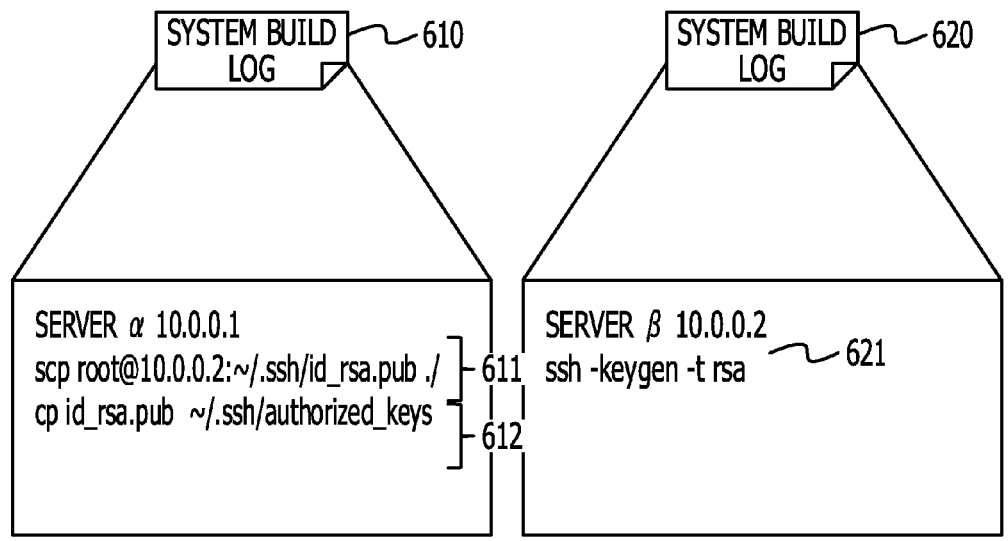
FIG. 6 is a diagram illustrating a specific example of a system build log.

FIG. 6 is a diagram illustrating specific examples of system build logs L. In FIG. 6, a system build log 610 is information indicating, in the order of execution, commands executed on the server α when the migration source system is built. The system build log 610 includes a log 611 and a log 612. The log 611 is a log of a command "scp", which is a command to perform an SSH-encrypted communication. The log 612 is a log of a command "cp", which is a command to copy a file.

A system build log 620 is information indicating, in the order of execution, commands executed on the server β when the migration source system is built. The system build log 620 includes a log 621. The log 621 is a log of a command "ssh", which is a command to generate a public key.

In the following discussion, it is assumed by way of example that in the migration source system, the command "ssh" is executed on the server β, the command "scp" is then executed on the server α, and, thereafter, the command "cp" is executed. That is, there is a dependency relationship in terms of the order of execution between the command "ssh" executed on the server β and the command "scp" executed on the server α.

Figure 7:
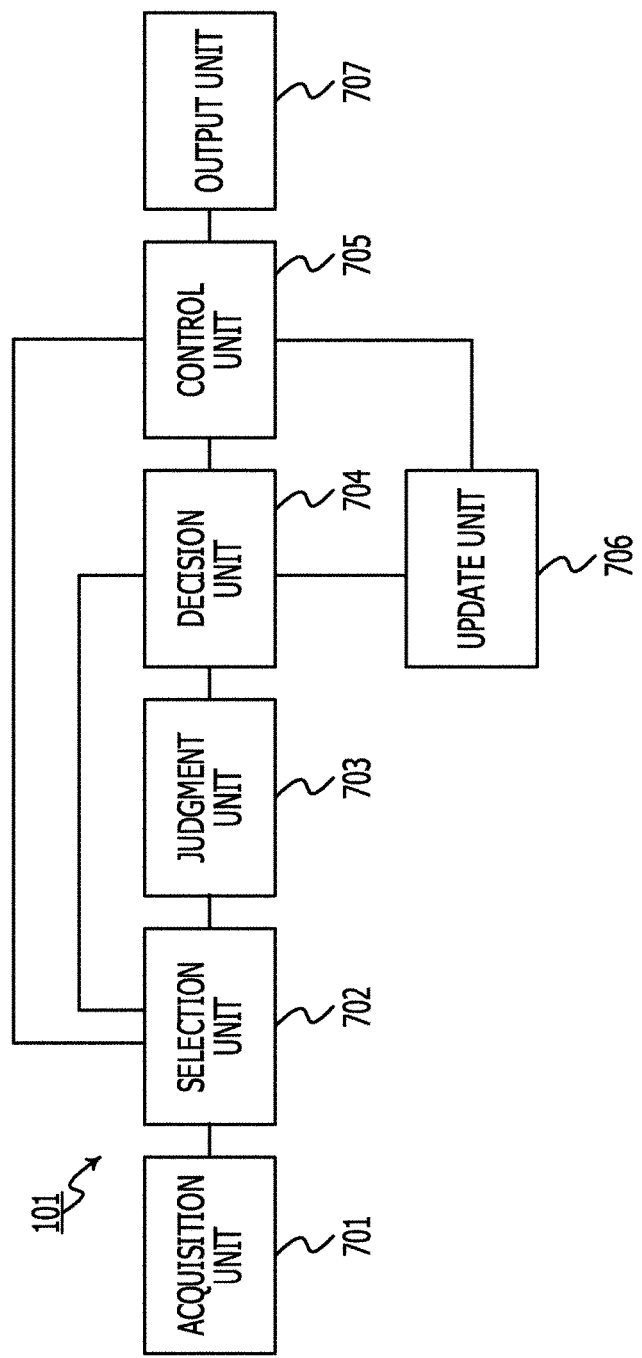
FIG. 7 is a block diagram illustrating an example of a functional configuration of an execution control apparatus.

FIG. 7 is a block diagram illustrating an example of a functional configuration of the execution control apparatus 101. In FIG. 7, the execution control apparatus 101 includes an acquisition unit 701, a selection unit 702, a judgment unit 703, a decision unit 704, a control unit 705, an update unit 706, and an output unit 707. A specific way of realizing these functional units is, for example, to execute a program stored in a storage apparatus such as the ROM 302, the RAM 303, the magnetic disk 305, or the like illustrated in FIG. 3 by the CPU 301 or via the I/F 306. A result of processing performed by each functional unit may be stored in a storage apparatus such as the RAM 303, the magnetic disk 305, or the like illustrated in FIG. 3.

In the following description, a plurality of servers in the system will also be referred to as servers S1 to Sn, and an arbitrary server of the servers S1 to Sn will be referred to as a server Si (where n is an integer equal to or greater than 2, and i=1, 2, . . . , n). A server Si may be realized by the information processing apparatus 201 illustrated in FIG. 2 or a virtual machine VM running on the information processing apparatus 201. A system build log L indicating, in the order of execution, commands executed on a particular server Si when the system is built will also be referred to as a system build log Li.

The acquisition unit 701 has a function of acquiring a system build log Li indicating, in the order of execution, commands executed on each server Si when the system is built. More specifically, for example, in accordance with an operation input by a user using the keyboard 308 or the mouse 309 illustrated in FIG. 3, the acquisition unit 701 acquires system build logs Li (for example, system build logs 610 and 620) indicating, in the order of execution, commands executed on respective servers Si (for example, respective servers α and β) when the system is built. In a case where a system build log Li is stored in each server Si, the acquisition unit 701 may receive the system build log Li from the server Si of the system.

The selection unit 702 has a function of selecting a command to be executed (hereinafter, such a selected command will also be referred to as a command of interest) from a set of commands executed on a server Si when the system is built. More specifically, for example, the selection unit 702 sequentially selects commands in the order of execution based on the system build log Li of the server Si. Hereinafter, a selected command to be executed on a server Si will also be referred to as a command C of interest.

The judgment unit 703 has a function of making a judgment, in a case where a command is selected as a command C of interest, as to whether an argument of the command C of interest is an argument associated with information that is input when the command C of interest is executed. More specifically, for example, the judgment unit 703 refers to the command property database 220 (see FIG. 4) and judges whether the command C of interest includes an argument associated with information that is input when the command C of interest is executed.

More specifically, for example, the judgment unit 703 judges whether the command C of interest includes an argument whose argument/option property is "input String" or "input file". This makes it possible to judge whether the command C of interest to be executed on the server Si has a dependency relationship in terms of the order of execution with commands executed on other servers Sj (I≠j, j=1, 2, . . . , n). Details of the process performed by the judgment unit 703 will be described later with reference to FIG. 8 to FIG. 12.

The decision unit 704 has a function of determining whether or not to allow the command C of interest to be executed. More specifically, for example, in a case where it is judged that the argument of the command C of interest is not an argument associated with information that is input when the command C of interest is executed, the decision unit 704 determines that it is allowed to execute the command C of interest.

On the other hand, in a case where it is judged that the argument of the command C of interest is an argument associated with information that is input when the command C of interest is executed, the decision unit 704 first refers to the system build log Li and identifies a value of the argument of the command C of interest executed when the migration source system was built. Next, the decision unit 704 extracts, from the mapping database 230 (see FIG. 5), mapping information in which the identified value of the argument of the command C of interest is set in the migration source system field of the mapping database 230. The decision unit 704 then judges whether information is set in the migration target system field of the extracted mapping information.

In a case where information is set in the migration target system field, the decision unit 704 determines that it is allowed to execute the command C of interest. Thus, as described above, in a case where there is information (a value of an argument) used in executing the command C of interest as configuration information of the migration target system, a decision is made that it is allowed to execute the command C of interest.

On the other hand, in a case where there is no information set in the migration target system field, the decision unit 704 determines that it is not allowed to execute the command C of interest. Thus, as described above, in a case where there is no information (a value of an argument) used in executing the command C of interest as configuration information of the migration target system, a decision is made that it is not allowed to execute the command C of interest. Details of the process performed by the decision unit 704 will be described later with reference to FIG. 8 to FIG. 12.

The selection unit 702 has a function of, in a case where the decision made is that it is not allowed to execute the current command C of interest, selecting a command C from a set of commands executed on another server Sj different from the server Si (hereinafter, such a selected command C will also be referred to as a command C of interest). More specifically, for example, the selection unit 702 refers to a system build log Lj of the server Sj different from the server Si, and selects, in the order of execution, commands C one by one to be executed on the server Sj. Thus, in a case where there is no information (a value of an argument) used in executing the command C of interest on the server Si, the selection unit 702 is capable of switching the command C of interest to a command of the server Sj different from the server Si.

The control unit 705 has a function of, in a case where the decision made is that it is allowed to execute the command C of interest, executing the command C of interest on the server Si. More specifically, for example, the control unit 705 transmits an instruction to the server Si to execute the command C of interest. The instruction to execute the command C of interest includes, for example, a value of the argument given to the command C of interest.

More specifically, for example, the control unit 705 may transmit, as the instruction to execute the command C of interest, a log corresponding to the command C of interest included in the system build log Li. In this case, if an argument of the command C of interest is an argument associated with information that is input when the command C of interest is executed, then the control unit 705 substitutes the value of this argument included in the log into corresponding configuration information in the mapping database 230 of the migration target system.

The update unit 706 has a function of updating system configuration information based on a result of the execution of the command C of interest. More specifically, for example, the update unit 706 may send an inquiry about the configuration information to the CMDB or the server Si of the migration target system, and may update the configuration information in the mapping database 230 of the migration target system. An example of a process of updating the mapping database 230 will be described later with reference to FIG. 8 to FIG. 12.

The selection unit 702 has a function of, in a case where the command C of interest is executed, selecting a next command C from unexecuted commands included in the set of commands executed on the server Si. More specifically, for example, the selection unit 702 refers to a system build log Li of the server Si and selects an unexecuted command, as a command C of interest, to be executed on the server Si. Thus, the selection unit 702 is capable of sequentially switching, in the order of execution, the command C of interest executed on the server Si.

As a function of the selection unit 702, in a case where there is no unexecuted command in the set of commands executed on the server Si, the selection unit 702 selects a command, as a command C of interest, from unexecuted commands included in a set of commands to be executed on another server Sj. More specifically, for example, the selection unit 702 refers to a system build log Lj of the server Sj different from the server Si, and selects a command, as a command C of interest, an unexecuted command to be executed on the server Sj. Thus, in a case where the execution of the set of commands on the server Si is completed, selection unit 702 is capable of switching the command C of interest from a command for the server Si to a command for another server Sj.

The output unit 707 has a function that in a case where a command C of interest is executed, the output unit 707 outputs a log indicating the command C of interest in relation to an identifier of a server Si on which the command C of interest is executed (hereinafter, such a log will be referred to as a system rebuild log). The identifier of the server Si may be, for example, an IP address, a host name, a user name, or the like, of the server Si of the migration target system. More specifically, for example, the output unit 707 may output an aggregated log PL such as that illustrated in FIG. 13.

An output form of the output unit 707 may be, for example, for storing in a storage apparatus such as the RAM 303, the magnetic disk 305, or the like, for displaying on the display 307, for outputting to a printer (not illustrated) for printing, for transmitting to an external computer via the I/F 306.

In a case where the decision made is that it is not allowed to execute the command C of interest, the selection unit 702 is capable of detecting an identifier of another server Sj from a log, corresponding to the command C of interest, in a set of logs included in the system build log Li. In a case where the selection unit 702 detects an identifier of another server Sj, the selection unit 702 is capable of selecting a command as a command C of interest from a set of commands to be executed on the server Sj identified by the identifier. Thus, in a case where the decision made is that it is not allowed to execute the command C of interest, it is possible to efficiently select a command having a dependency relationship with the command C of interest in terms of the order of execution.

Next, an example of an execution control process performed by the execution control apparatus 101 is described below.

Figure 8:
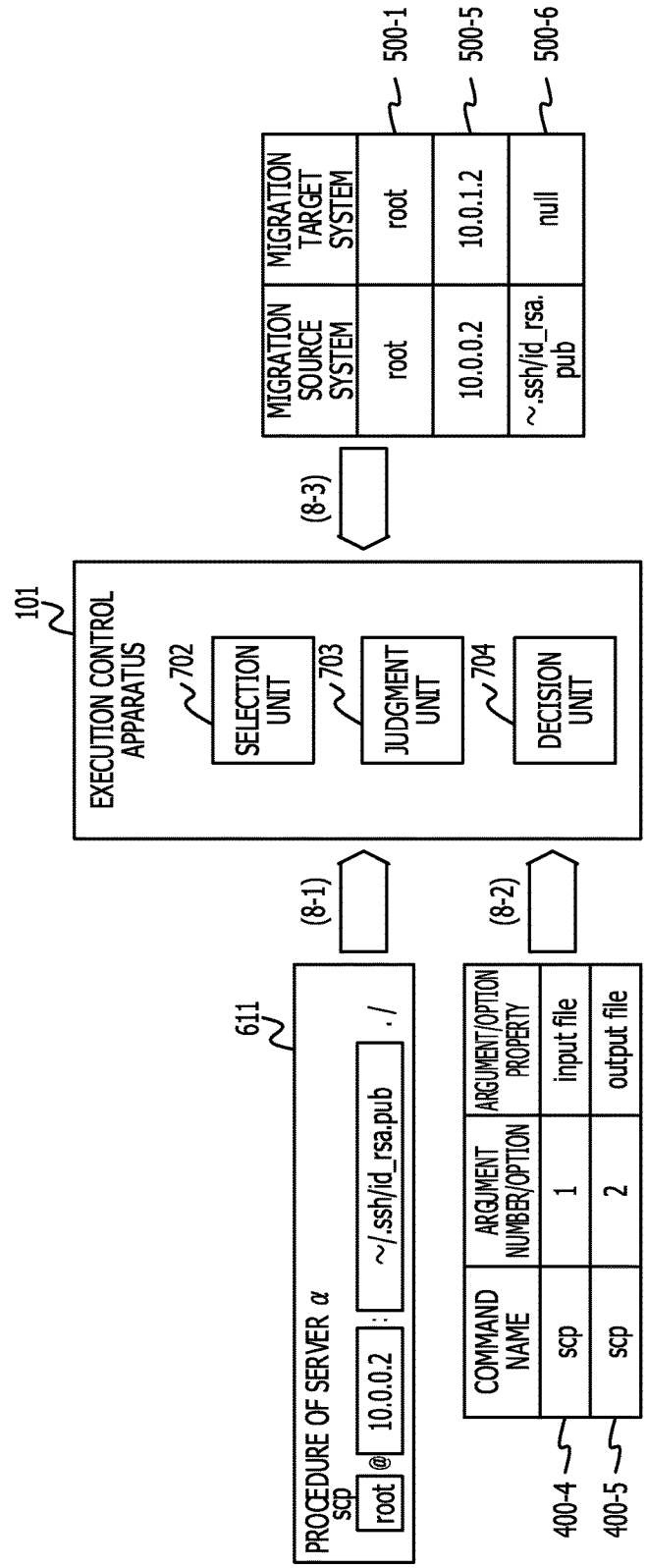
FIG. 8 is a diagram illustrating an example of an execution control process performed by an execution control apparatus.

FIG. 8 to FIG. 12 are diagrams illustrating examples of execution control processes performed by the execution control apparatus 101. Referring to FIG. 8, in (8-1), the selection unit 702 refers to the system build log 610 of the server α (see FIG. 6), and selects a command as a command C of interest to be executed on the server α. In the example illustrated in FIG. 8, a command "scp" in the log 611 is selected as the command C of interest.

In (8-2), the judgment unit 703 refers to the command property database 220, and judges whether the command C of interest "scp" includes an argument associated with information that is input when the command C of interest "scp" is executed. In this specific example, the property of a first argument of the command C of interest "scp" is "input file", and thus it is judged that the command C of interest "scp" includes an argument associated with information that is input when the command C of interest "scp" is executed.

In (8-3), the decision unit 704 determines whether or not to allow it to execute the command C of interest "scp". More specifically, for example, the decision unit 704 first refers to the log 611 and identifies values of arguments of the command C of interest "scp" when the command C of interest "scp" was executed to build the migration source system. More specifically, in this specific example, "root", "10.0.0.2", and "~/.ssh/id_rsa.pub" are identified.

Next, the decision unit 704 extracts, from the mapping database 230, mapping information in which the values of the arguments of the command C of interest "scp", that is, "root", "10.0.0.2", and "~/.ssh/id_rsa.pub" are set in the migration source system field. In this specific example, mapping information 500-1, mapping information 500-5, and mapping information 500-6 are extracted.

The decision unit 704 then judges whether information is set in migration target system fields of the respective mapping information 500-1, mapping information 500-5, and mapping information 500-6. In the present example, the migration target system field of the mapping information 500-6 is "null", and thus the decision unit 704 judges that no information is set in the migration target system field of the mapping information 500-6. Therefore, the decision unit 704 determines that it is not allowed to execute the command C of interest "scp".

Figure 9:
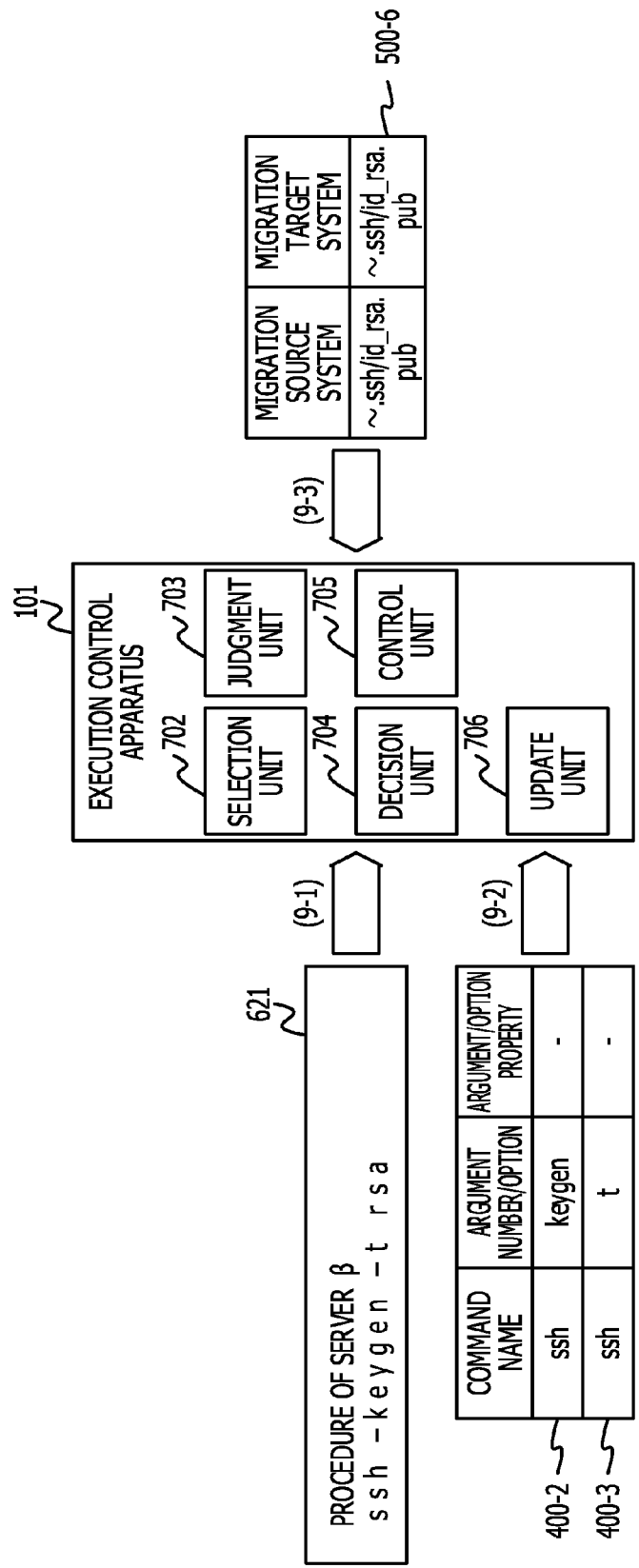
FIG. 9 is a diagram illustrating an example of an execution control process performed by an execution control apparatus.

Referring to FIG. 9, in (9-1), in a case where the decision made is that it is not allowed to execute the command C of interest "scp", the selection unit 702 refers to the system build log 620 of the server β (see FIG. 6), and selects a command as a command C of interest to be executed on the server R. In the example illustrated in FIG. 9, "ssh" in the log 621 is selected as a command C of interest.

In (9-2), the judgment unit 703 refers to the command property database 220, and judges whether the command C of interest "ssh" includes an argument associated with information that is input when the command C of interest "ssh" is executed. In this case, the command C of interest "ssh" has an argument "keygen" and an option "t", and properties thereof are both "-", and thus it is judged that the command C of interest "ssh" includes no argument associated with information that is input when the command C of interest "ssh" is executed.

In (9-3), in a case where the judgment made is that the command C of interest "ssh" includes no argument associated with information that is input when the command C of interest "ssh" is executed, the decision unit 704 determines that it is allowed to execute the command C of interest "ssh". In a case where the decision made is that it is allowed to execute the command C of interest "ssh", the control unit 705 executes the command C "ssh" on the server β.

The update unit 706 sends an inquiry about the configuration information to the server β of the migration target system and updates the mapping database 230. In this specific example, "~/.ssh/id_rsa.pub" is set in a migration target system field of the mapping information 500-6 in the mapping database 230.

Figure 10:
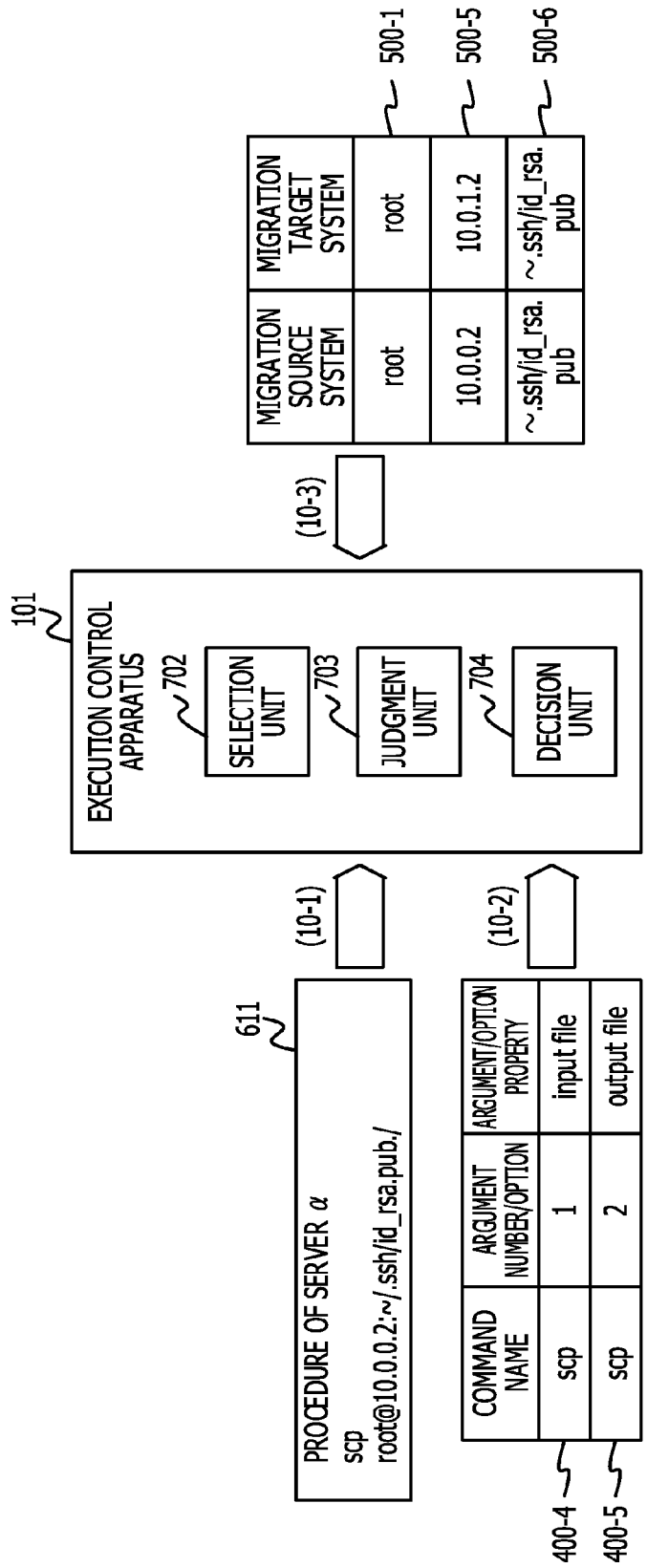
FIG. 10 is a diagram illustrating an example of an execution control process performed by an execution control apparatus.

Referring to FIG. 10, in (10-1), the selection unit 702 refers to the system build log 610 of the server α (see FIG. 6), and selects a command as a command C of interest to be executed on the server α. In the example illustrated in FIG. 10, a command "scp" in the log 611 is selected as the command C of interest.

In (10-2), the judgment unit 703 refers to the command property database 220 and judges whether the command C of interest "scp" includes an argument associated with information that is input when the command C of interest "scp" is executed. In this specific example, the property of a first argument of the command C of interest "scp" is "input file", and thus it is judged that the command C of interest "scp" includes an argument associated with information that is input when the command C of interest "scp" is executed.

In (10-3), the decision unit 704 determines whether or not to allow it to execute the command C of interest "scp". More specifically, for example, the decision unit 704 first refers to the log 611 and identifies values of a first argument of the command C of interest "scp" when the command C of interest "scp" was executed to build the migration source system. More specifically, in this specific example, "root", "10.0.0.2", and "~/.ssh/id_rsa.pub" are identified.

Next, the decision unit 704 extracts, from the mapping database 230, mapping information in which the values of the argument of the command C of interest "scp", that is, "root", "10.0.0.2", and "~/.ssh/id_rsa.pub" are set in the migration source system field. In this specific example, mapping information 500-1, mapping information 500-5, and mapping information 500-6 are extracted.

The decision unit 704 then judges whether information is set in migration target system fields of the respective mapping information 500-1, mapping information 500-5, and mapping information 500-6. In this specific example, the decision unit 704 judges that information is set in migration target system fields of the respective mapping information 500-1, mapping information 500-5, and mapping information 500-6. Therefore, the decision unit 704 determines that it is allowed to execute the command C of interest "scp".

Figure 11:
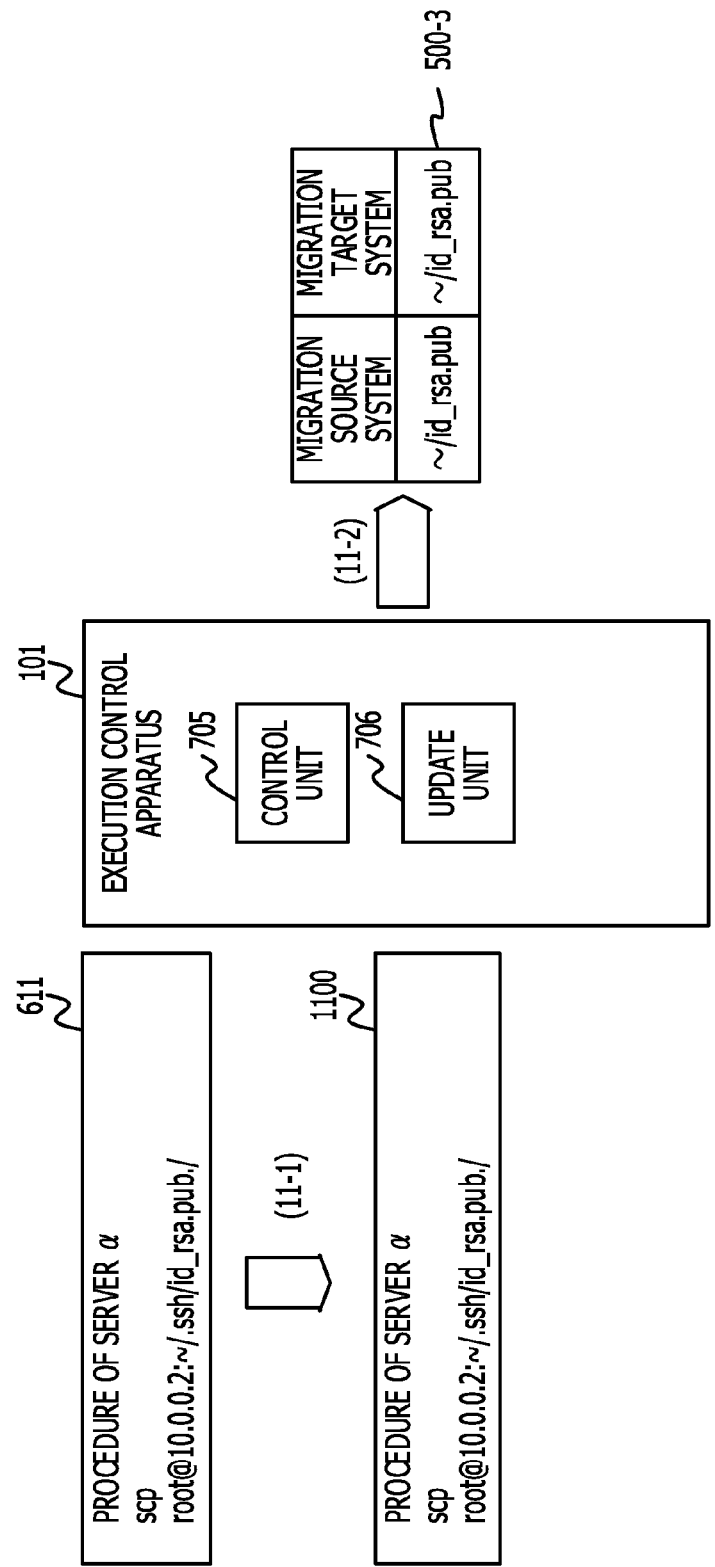
FIG. 11 is a diagram illustrating an example of an execution control process performed by an execution control apparatus.

Referring to FIG. 11, in (11-1), in a case where the decision made is that it is allowed to execute the command C of interest "scp", the control unit 705 executes the command "scp" on the server α. More specifically, for example, the control unit 705 substitutes values of the first argument included in the log 611 into corresponding configuration information in the mapping database 230 of the migration target system thereby generating an execution instruction 1100 to execute the command C of interest "scp".

Thus, in this specific example, a value "root" of the argument is substituted into "root", a value "10.0.0.2" of the argument is substituted into "10.0.1.2", and a value "~/.ssh/id_rsa.pub" of the argument is substituted into "~/.ssh/id_rsa.pub". The values "root" and "~/.ssh/id_rsa.pub" of the argument are the same as those of the migration source system, and thus the substitution may not be performed. The control unit 705 then transmits the execution instruction 1100 to the server α to execute the command C of interest "scp".

In (11-2), in a case where the execution instruction 1100 is transmitted, the update unit 706 sends an inquiry about the configuration information to the server β of the migration target system and updates the mapping database 230. In this specific example, "~/id_rsa.pub" is set in a migration target system field of the mapping information 500-3 in the mapping database 230.

Figure 12:
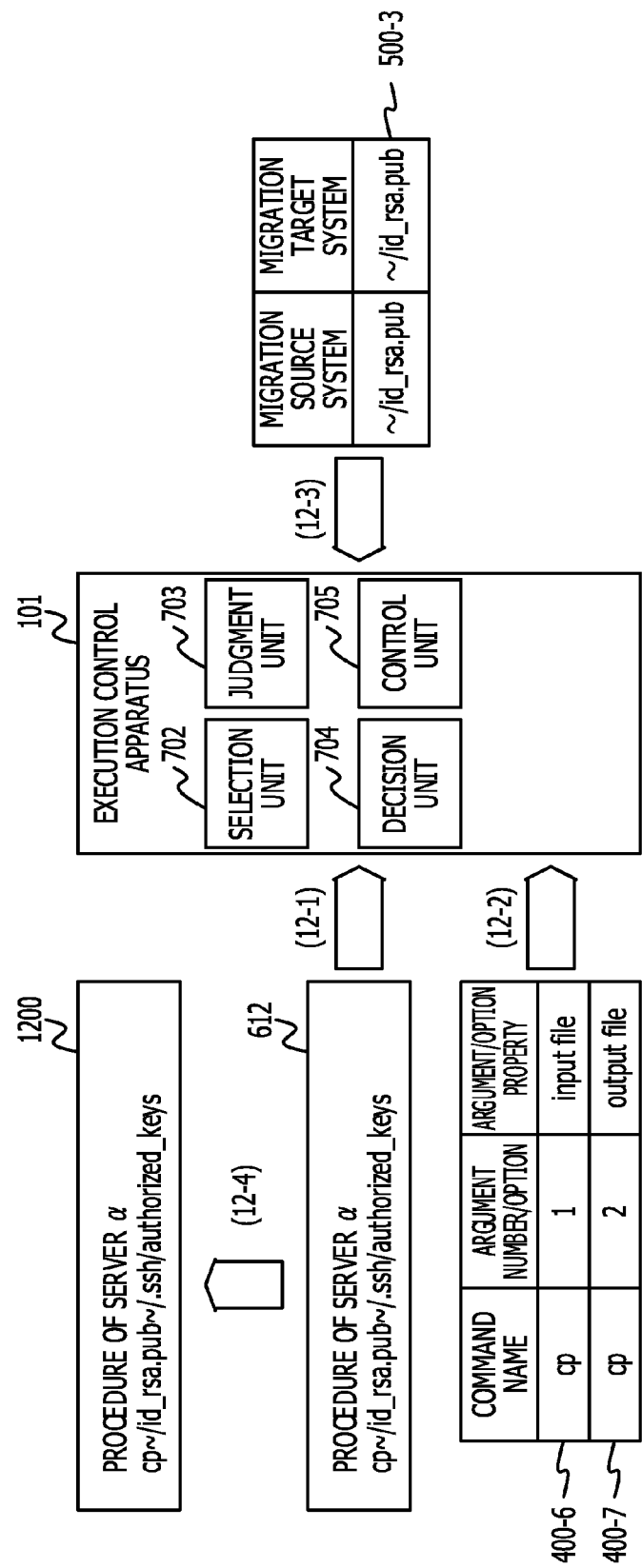
FIG. 12 is a diagram illustrating an example of an execution control process performed by an execution control apparatus.

Referring to FIG. 12, in (12-1), the selection unit 702 refers to the system build log 610 of the server α (see FIG. 6), and selects a command C of interest to be executed on the server α. In the example illustrated in FIG. 12, a command "cp" in the log 612 is selected as a command C of interest.

In (12-2), the judgment unit 703 refers to the command property database 220 and judges whether the command C of interest "cp" includes an argument associated with information that is input when the command C of interest "cp" is executed. In this specific example, the property of a first argument of the command C of interest "cp" is "input file", and thus it is judged that the command C of interest "cp" includes an argument associated with information that is input when the command C of interest "cp" is executed.

In (12-3), the decision unit 704 determines whether or not to allow it to execute the command C of interest "cp". More specifically, for example, the decision unit 704 first refers to the log 612 and identifies values of a first argument of the command C of interest "cp" when the command C of interest "scp" was executed to build the migration source system. More specifically, in this specific example, "~/id_rsa.pub" is identified.

Next, the decision unit 704 extracts, from the mapping database 230, mapping information in which the value "~/id_rsa.pub" of the argument of the command C of interest "cp" is set in a field of the migration source system. In this specific example, mapping information 500-3 is extracted.

The decision unit 704 then judges whether information is set in a migration target system field of the mapping information 500-3. In this specific example, the decision unit 704 judges that information is set in the migration target system field of the mapping information 500-3. Therefore, the decision unit 704 determines that it is allowed to execute the command C of interest "cp".

In (12-4), in a case where the decision made is that it is allowed to execute the command C of interest "cp", the control unit 705 executes the command C "cp" on the server α. More specifically, for example, the control unit 705 substitutes values of the first argument included in the log 612 into corresponding configuration information in the mapping database 230 of the migration target system thereby generating an execution instruction 1200 to execute the command C of interest "cp". Thus, in this specific example, the value "id_rsa.pub" of the argument is substituted into "id_rsa.pub". The control unit 705 then transmits the execution instruction 1200 to the server α to execute the command C of interest "cp".

Next, an explanation is given below as to an aggregated log PL indicating, in the order of execution, commands executed on the servers Si when the migration target system is built.

Figure 13:
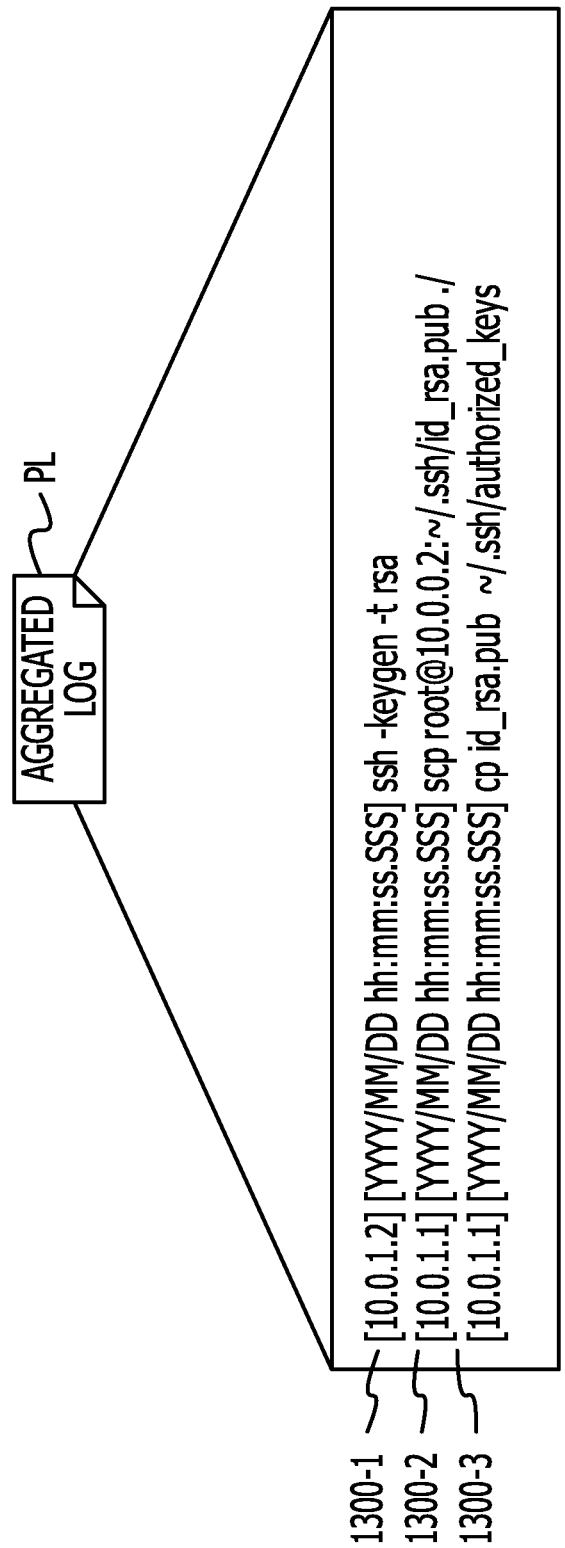
FIG. 13 is a diagram illustrating a specific example of an aggregated log.

FIG. 13 is a diagram illustrating a specific example of an aggregated log PL. In FIG. 13, the aggregated log PL indicates, in the order of execution, system rebuild logs 1300-1 to 1300-3 executed on the servers α and β when the migration target system is built.

Each of the system rebuild logs 1300-1 to 1300-3 includes an IP address of corresponding one of the servers α and β. Each of the system rebuild logs 1300-1 to 1300-3 includes a transmission time at which an execution instruction (for example, an execution instruction 1100, and an execution instruction 1200) is transmitted to the server α or β. Each of the system rebuild logs 1300-1 to 1300-3 includes a command executed on the server α or β.

Use of the aggregated log PL makes it possible to identify, in the order of execution, commands executed on the servers α and β when the migration target system is built. Therefore, when a system is newly built, it is allowed to execute commands on servers α and β according to the aggregated log PL thereby building the system correctly taking into account the dependency relationship between the servers in terms of the order of execution without explicit concern for it.

Use of the aggregated log PL makes it possible to identify the timing of executing the commands on the servers α and β from the recorded transmission times at which the execution instructions were transmitted to the server α or β. Note that the transmission times do not depend on time measurements of the servers α and β, and thus it is possible to correctly build the system without explicit concern for the dependency relationship between the servers in terms of the order of execution even in a case where synchronization of time is not achieved between servers.

Next, an explanation is given below as to an example of an execution control process performed by the execution control apparatus 101 for a case where a system includes three or more servers. In the following discussion, a third server different from the servers α and β described above will be referred to as a server γ. In the following discussion, it is assumed by way of example that an IP address of the server γ in the migration source system is "10.0.0.3", and an IP address of the server γ in the migration target system is "10.0.1.3". The configuration information of the migration source system and the configuration information of the migration target system other than those associated with the server γ are the same as the configuration information for the case described above in which the migration source system and the migration target system are built for the two servers α and β.

Figure 14:
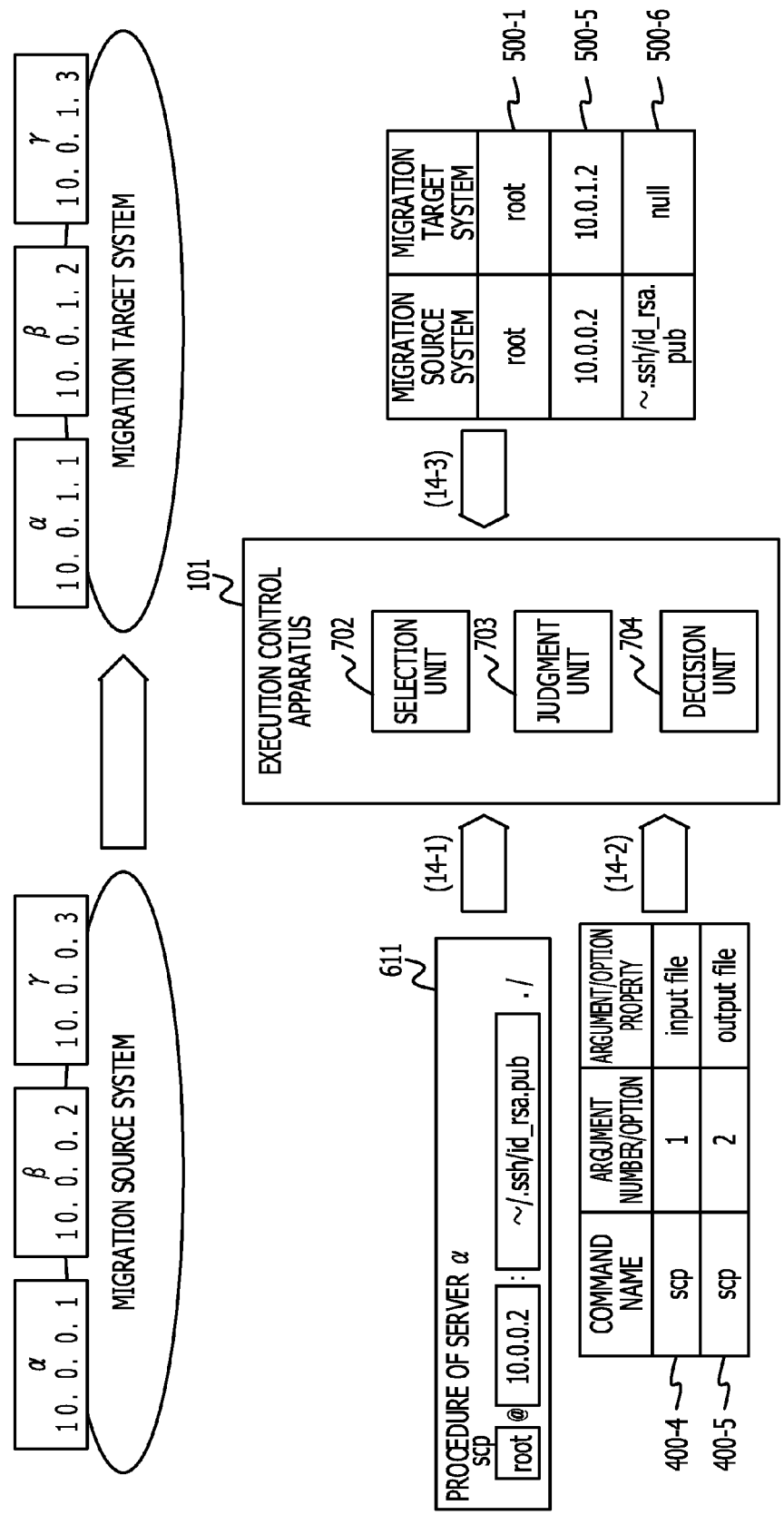
FIG. 14 is a diagram illustrating an example of an execution control process performed by an execution control apparatus.

FIG. 14 is a diagram illustrating an example of the execution control process performed by the execution control apparatus 101. Referring to FIG. 14, in (14-1), the selection unit 702 refers to the system build log 610 of the server α (see FIG. 6), and selects a command as a command C of interest to be executed on the server α. In the example illustrated in FIG. 14, a command "scp" in the log 611 is selected as the command C of interest.

In (14-2), the judgment unit 703 refers to the command property database 220 and judges whether the command C of interest "scp" includes an argument associated with information that is input when the command C of interest "scp" is executed. In this specific example, the property of a first argument of the command C of interest "scp" is "input file", and thus it is judged that the command C of interest "scp" includes an argument associated with information that is input when the command C of interest "scp" is executed.

In (14-3), the decision unit 704 determines whether or not to allow it to execute the command C of interest "scp". The decision as to whether or not to allow it to execute the command C of interest "scp" may be made in a similar manner to that described above with reference (8-3) of FIG. 8, and thus a further description thereof is omitted. That is, in this specific case, a decision is made that it is not allowed to execute the command C of interest "scp".

In this case, the selection unit 702 selects a command C of interest from a set of commands executed on the server β or the server γ different from the server α. In this case, the selection unit 702 may refer to mapping information 500-6 including no information used in executing the command C "scp" of interest on the server α and may select the server β or the server γ.

More specifically, for example, the selection unit 702 may select a server identified from a character string set in a configuration information field of the mapping information 500-6. In this specific example, the server γ is selected. Thus it is possible to efficiently select a command having a dependency relationship with the command C of interest "scp" on the server α in terms of the order of execution.

Next, an execution control process procedure of the execution control apparatus 101 is described below.

Figure 15:
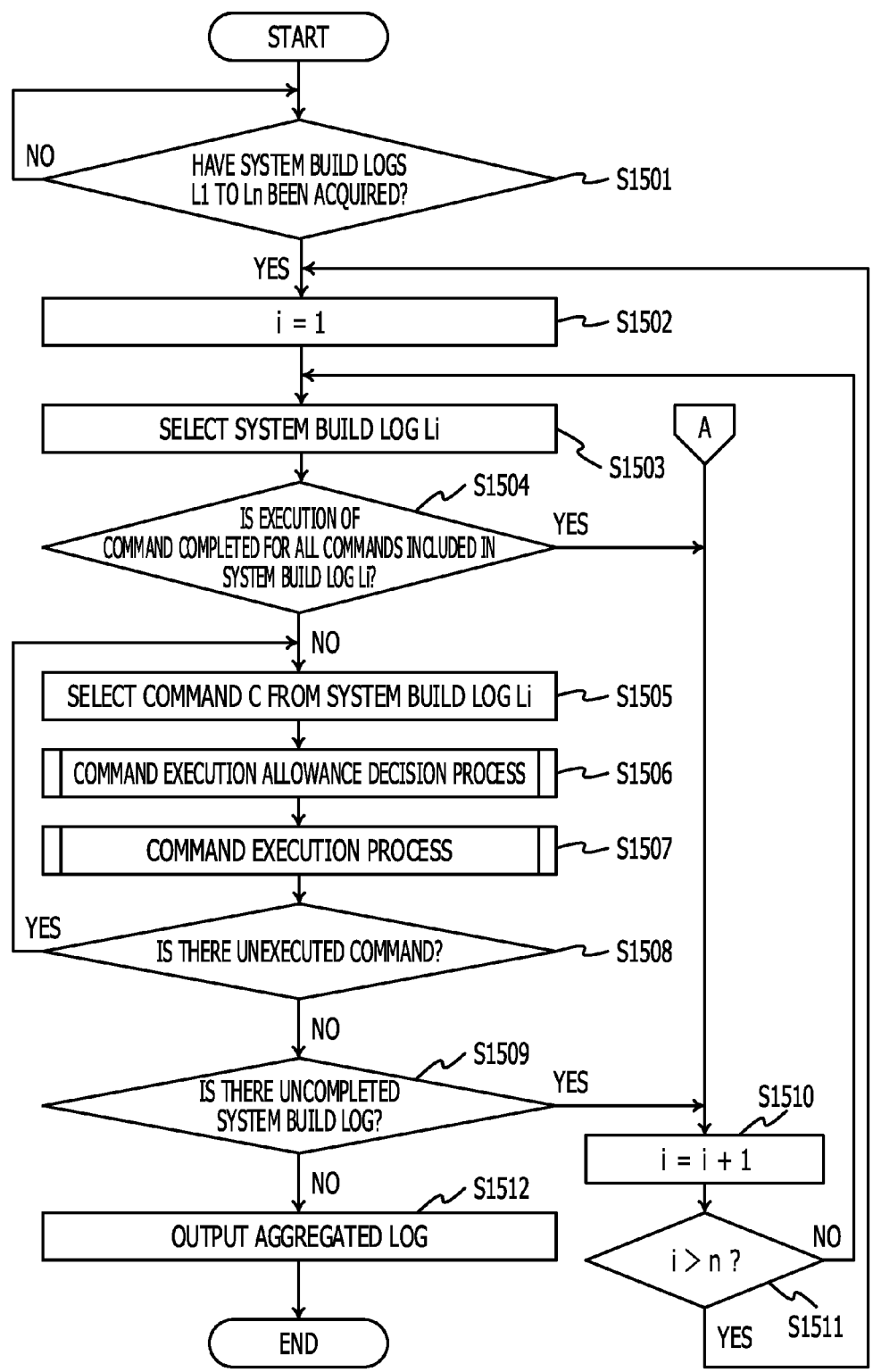
FIG. 15 is a flow chart illustrating an example of a first execution control process procedure performed by an execution control apparatus.

FIG. 15 is a flow chart illustrating an example of a first execution control process procedure performed by the execution control apparatus 101. In the flow chart illustrated in FIG. 15, first, the execution control apparatus 101 judges whether system build logs L1 to Ln of the migration source system have been acquired (S1501).

In a case where all system build logs have not been acquired (S1501: No), the execution control apparatus 101 waits until system build logs L1 to Ln of the migration source system have been acquired. In a case where the system build logs L1 to Ln of the migration source system have been acquired (S1501: Yes) the execution control apparatus 101 initializes a value of "i" of the system build log Li to "i=1". (S1502).

The execution control apparatus 101 then selects the system build log Li from the system build logs L1 to Ln (S1503). The execution control apparatus 101 then judges whether execution associated with the system build log Li is completed (S1504). Note that the execution associated with the system build log Li is completed when commands corresponding to all logs included in the system build log Li have been executed.

In a case where the execution associated with the system build log Li is completed (S1504: Yes), the execution control apparatus 101 advances the processing flow to S1510. On the other hand, in a case where the execution associated with the system build log Li is not completed (S1504: No), the execution control apparatus 101 selects, from the system build log Li, a command as a command C of interest to be executed on a server Si of the migration target system (S1505). The command C of interest is a command that is at the earliest position in the order of execution of unexecuted commands included in commands corresponding to logs in the system build log Li.

Thereafter, the execution control apparatus 101 performs a command execution allowance decision process to determine whether or not to allow it to execute the selected command C of interest (S1506). Details of the processing procedure of the command execution allowance decision process will be described later with reference to FIG. 16.

Thereafter, the execution control apparatus 101 performs a command execution process to execute the command C of interest (S1507). Details of the processing procedure of the command execution process will be described later with reference to FIG. 17. The execution control apparatus 101 then judges whether the system build log Li includes a command remaining unexecuted (S1508).

In a case where there is a command that has not yet been executed (S1508: Yes), the execution control apparatus 101 returns the processing flow to S1505. On the other hand, in a case where there is no unexecuted command (S1508: No), the execution control apparatus 101 judges whether the system build logs L1 to Ln include an unexecuted system build log (S1509).

In a case where there is an unexecuted system build log (S1509: Yes), the execution control apparatus 101 increments "i" of the system build log Li (S1510), and determines whether "i" is greater than "n" (S1511). In a case where "i" is equal to or smaller than "n" (S1511: No), the execution control apparatus 101 returns the processing flow to S1503. On the other hand, in a case where i is greater than n (S1511: Yes), the execution control apparatus 101 returns the processing flow to S1502.

In a case where it is judged in S1509 that there is no unexecuted system build log (S1509: No), the execution control apparatus 101 outputs an aggregated log PL (S1512), and the execution control apparatus 101 ends the sequence of processes according to the present flow chart. The aggregated log PL is information indicating, in the order of execution, system rebuild logs of commands C executed on the servers Si when the migration target system is built.

This makes it possible to execute commands taking into account the dependency relationship in terms of the order of execution among servers in the migration target system.

Next, a specific example is described below as to a processing procedure of the command execution allowance decision process in S1506 in FIG. 15.

Figure 16:
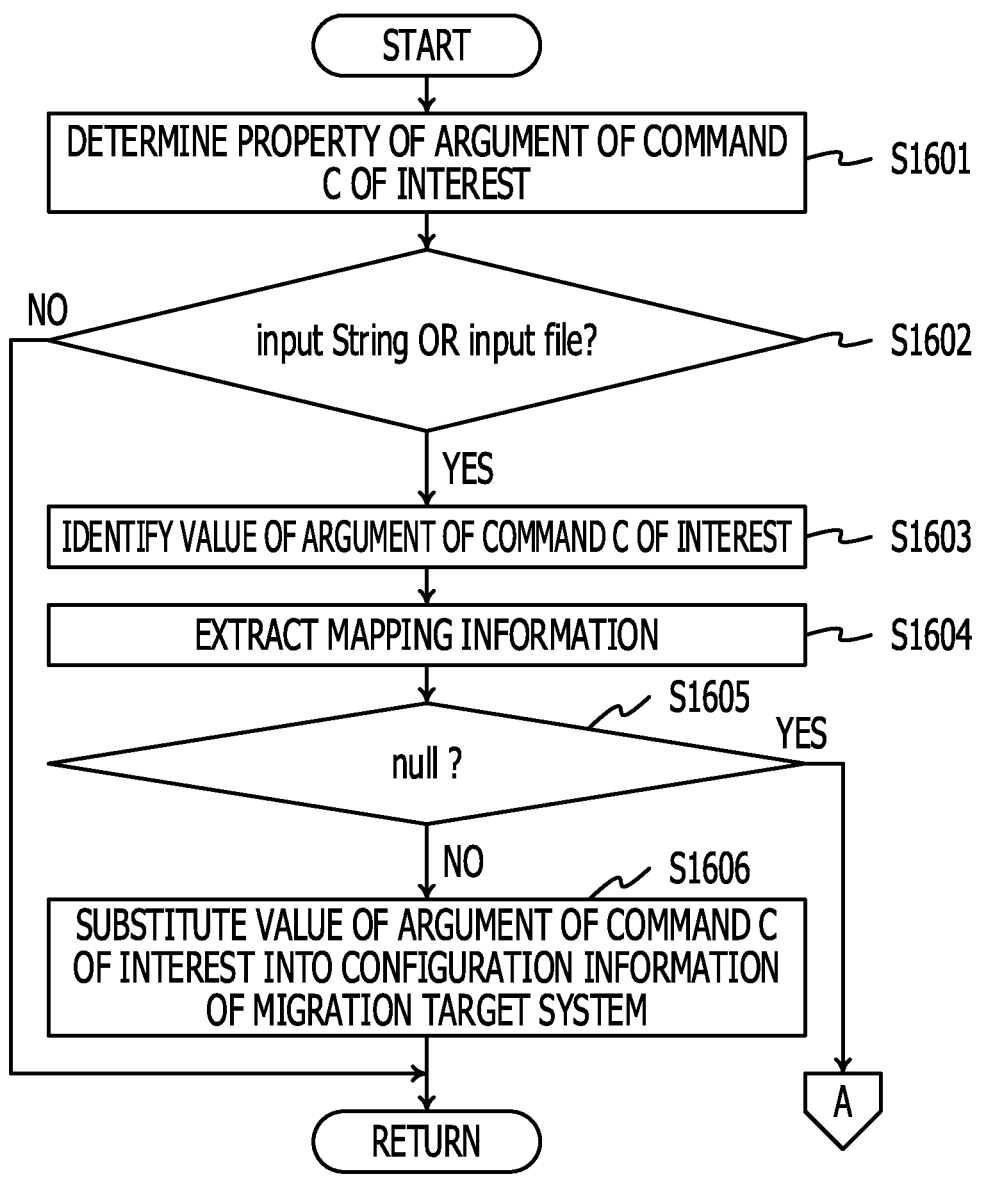
FIG. 16 is a flow chart illustrating a specific example of a processing procedure of a command execution allowance decision process.

FIG. 16 is a flow chart illustrating a specific example of a processing procedure of the command execution allowance decision process. In the flow chart illustrated in FIG. 16, first, the execution control apparatus 101 refers to the command property database 220 and determines the property of an argument of a command C of interest (S1601).

The execution control apparatus 101 then determines whether the property of the command C of interest is "input String" or "input file" (S1602). In a case where the property is neither "input String" nor "input file" (S1602: No), the execution control apparatus 101 returns the processing flow to a step in which the command execution allowance decision process was called.

On the other hand, in a case where the property is "input String" or "input file" (S1602: Yes), the execution control apparatus 101 refers to a system build log Li and identifies a value of the argument of the command C of interest executed when the migration source system built (S1603).

The execution control apparatus 101 then extracts, from the mapping database 230, mapping information in which the identified value of the argument of the command C of interest is set in a migration source system field (S1604).

The execution control apparatus 101 then determines whether "null" is set in a migration target system field of the extracted mapping information (S1605). In a case where "null" is set (S1605: Yes), the execution control apparatus 101 advances the processing flow to S1510 illustrated in FIG. 15.

On the other hand, in a case where "null" is not set (S1605: No), the execution control apparatus 101 substitutes the value of the argument of command C of interest into the information set in the migration target system field of the extracted mapping information (S1606). Thereafter, the execution control apparatus 101 returns the processing flow to the step in which the command execution allowance decision process was called.

Thus, in a case where the command C of interest has a dependency relationship in terms of the order of execution among servers, the execution control apparatus 101 is capable of determining whether or not to allow it to execute command C of interest depending on whether configuration information (a value of an argument) of the migration target system, which is to be used in executing the command C of interest, is set in the mapping database 230.

Next, a specific example is described below as to a processing procedure of the command execution process in S1507 in FIG. 15.

Figure 17:
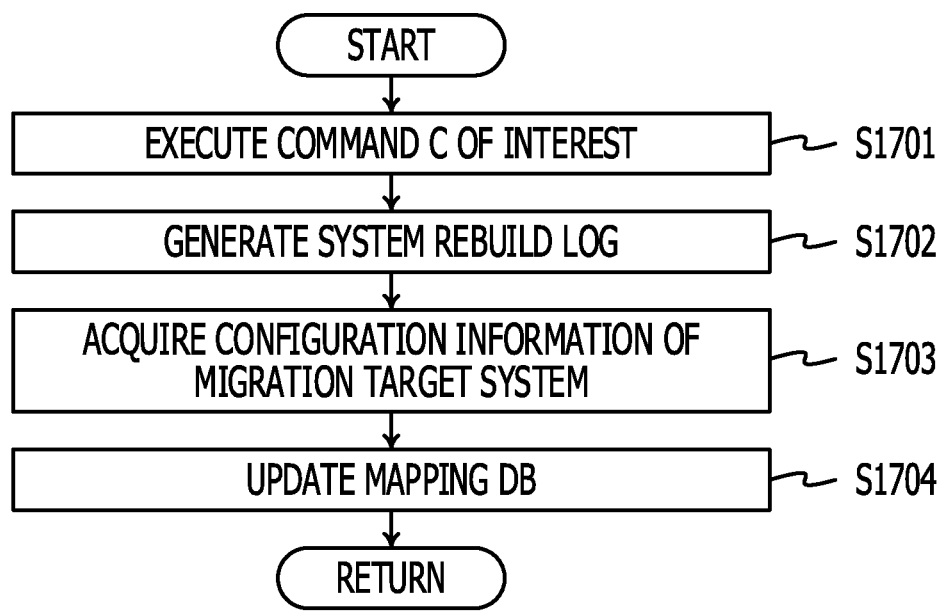
FIG. 17 is a flow chart illustrating a specific example of a processing procedure of a command execution process.

FIG. 17 is a flow chart illustrating a specific example of a processing procedure of the command execution process. In the flow chart illustrated in FIG. 17, first, the execution control apparatus 101 executes a command C of interest on a server Si (S1701). The execution control apparatus 101 then generates a system rebuild log indicating the command C of interest in relation to an IP address of the server Si (S1702).

The execution control apparatus 101 then acquires configuration information of a migration target system by sending an inquiry about it to the server Si of the migration target system (S1703). The execution control apparatus 101 updates contents stored in the mapping database 230 based on the acquired configuration information of the migration target system (S1704), and returns the processing flow to a step in which the command execution process was called.

Thus the execution control apparatus 101 is capable of executing the command C of interest on the server Si, and the execution control apparatus 101 is capable of generating the system rebuild log indicating the command C of interest in relation to the IP address of the server Si on which the command C of interest is executed.

Next, a second execution control process procedure performed by the execution control apparatus 101 is described below. The second execution control process is a process of controlling the execution of commands on the servers Si when the system is built, based on the aggregated log PL output in S1512 illustrated in FIG. 15.

FIG. 18 is a flow chart illustrating an example of a second execution control process procedure performed by the execution control apparatus 101. In the flow chart illustrated in FIG. 18, first, the execution control apparatus 101 determines whether an aggregated log PL of a migration source system has been acquired (S1801). In a case where the aggregated log PL has not been acquired (S1801: No), the execution control apparatus 101 waits until the aggregated log PL of the migration source system has been acquired.

In a case where the aggregated log PL of the migration source system has been acquired (S1801: Yes), the execution control apparatus 101 selects, from the aggregated log PL, a command as a command C of interest to be executed on a server Si of a migration target system (S1802). The command C of interest is a command that is at the earliest position in the order of execution of unexecuted commands included in commands corresponding to system rebuild logs in the system build log Li.

The execution control apparatus 101 then refers to the command property database 220 and determines the property of an argument of the command C of interest (S1803). The execution control apparatus 101 then determines whether the property of the command C of interest is "input String" or "input file" (S1804).

In a case where the property is neither "input String" nor "input file" (S1804: No), the execution control apparatus 101 advances the processing flow to S1808. On the other hand, in a case where the property is "input String" or "input file" (S1804: Yes), the execution control apparatus 101 refers to the aggregated log PL and identifies a value of the argument of the command C of interest executed when the migration source system is built (S1805).

The execution control apparatus 101 then extracts, from the mapping database 230, mapping information in which the identified value of the argument of the command C of interest is set in a migration source system field (S1806). The execution control apparatus 101 substitutes the value of the argument of command C of interest into the information set in the migration target system field of the extracted mapping information (S1807).

The execution control apparatus 101 then executes the command C of interest on the server Si (S1808). The execution control apparatus 101 then acquires configuration information of the migration target system by sending an inquiry about it to the server Si of the migration target system (S1809). The execution control apparatus 101 then updates stored contents of the mapping database 230 based on the acquired configuration information of the migration target system (S1810).

The execution control apparatus 101 then determines whether the aggregated log PL includes a command remaining unexecuted (S1811). In a case where there is a command that has not yet been executed (S1811: Yes), the execution control apparatus 101 returns the processing flow to S1802. On the other hand, in a case where there is no unexecuted command (S1811: No), the execution control apparatus 101 ends the sequence of processes according to the present flow chart.

This makes it possible to execute commands to build the system correctly taking into account the dependency relationship among servers in terms of the order of execution of command without explicit concern for it.

As described above, when a command is selected as a command C of interest from a set of commands to be executed on a server Si, the execution control apparatus 101 is capable of making a determination, by referring to the command property database 220, as to whether the command C of interest has an argument associated with information that is input when the command C of interest is executed thereby making it possible to determine whether the command C of interest to be executed on the server Si has a dependency relationship in terms of the order of execution with a command to be executed on another server Sj.

In a case where the command C of interest does not have an argument associated with information that is input when the command C of interest is executed, the execution control apparatus 101 determines that it is allowed to execute the command C of interest. That is, in a case where the command C of interest is a command having no dependency relationship in terms of the order of execution among servers, a decision is made that it is allowed to execute the command C of interest.

Thus, in a case where an argument of the command C of interest is an argument associated with information that is input when the command C of interest is executed, the execution control apparatus 101 is capable of determining whether or not to allow it to execute the command C of interest by referring to the mapping database 230. More specifically, for example, the execution control apparatus 101 refers to a system build log Li and identifies a value of the argument of the command C of interest executed when the migration source system is built. The execution control apparatus 101 extracts, from the mapping database 230, mapping information in which the identified value of the argument of the command C of interest is set in a migration source system field, and determines whether information is set in the migration target system field of the mapping information. In a case where there information set in the migration target system field, the execution control apparatus 101 determines that it is allowed to execute the command C of interest. On the other hand, in a case where there is no information set in the migration target system field, the execution control apparatus 101 determines that it is not allowed to execute the command C of interest.

Thus in a case where there is information (a value of an argument) used in executing a command C of interest as configuration information of the migration target system, it is determined that it is allowed to execute the command C of interest. In a case where there is no information (a value of an argument) used in executing the command C of interest in configuration information of the migration target system, it is determined that it is not allowed to execute the command C of interest.

In a case where it is not allowed to execute a command C of interest, the execution control apparatus 101 selects a command C of interest from a set of commands executed on another server Sj different from the server Si. Thus in a case where there is no information (a value of an argument) used in executing the command C of interest on the server Si, the execution control apparatus 101 is capable of switching the current command C of interest to a command of the server Sj different from the server Si.

In a case where it is allowed to execute a command C of interest, the execution control apparatus 101 executes the command C of interest on the server Si. The execution control apparatus 101 is capable of updating stored contents (configuration information of a migration target system) of the mapping database 230 based on a result of the execution of the command C of interest. Thus, each time a command C of interest is executed, it is possible to register, in the mapping database 230, information (a value of an argument) used in executing another command.

In a case where a command C of interest is executed, the execution control apparatus 101 is capable of selecting a command C of interest from unexecuted commands in a set of commands supposed to be executed on a server Si. Thus the execution control apparatus 101 is capable of sequentially switching, in the order of execution, the command C of interest executed on the server Si.

In a case where there is no unexecuted command in the set of commands executed on the server Si, the execution control apparatus 101 is capable of selecting a command C of interest from unexecuted commands included in a set of commands executed on another server Sj. Thus in a case where the execution of the set of commands on the server Si is completed, the execution control apparatus 101 is capable of switching the command C of interest from a command for the server Si to a command for another server Sj.

In a case where it is not allowed to execute a command C of interest, the execution control apparatus 101 is capable of detecting an identifier of another server Sj from a log, corresponding to the command C of interest, in a set of logs included in a system build log Li. In a case where an identifier of another server Sj is detected, the execution control apparatus 101 is capable of selecting a command C of interest from a set of commands to be executed on the server Sj identified by the identifier. Thus in the case where it is not allowed to execute the command C of interest, the execution control apparatus 101 is capable of efficiently selecting a command having a dependency relationship with the command C of interest in terms of the order of execution.

In a case where a command C of interest is executed, the execution control apparatus 101 is capable of generating a system rebuild log indicating the command C of interest in relation to an identifier of a server Si on which the command C of interest is executed. The execution control apparatus 101 is capable of outputting an aggregated log PL indicating, in the order of execution, system rebuild logs as a result of the building of the migration target system. Therefore, when a system is newly built, it is allowed to build the system by executing commands on servers Si according to the aggregated log PL without explicit concern for dependency relationships in terms of the order of execution among servers.

With the above-described features of the execution control apparatus 101, in a case where a system is built using servers 51 to Sn, it is possible to execute commands on servers Si taking into account a dependency relationship in terms of the order of execution among the servers, which result in a reduction in a load associated with the operation of building the system. In a case where commands do not have a dependency relationship in terms of the order of execution among servers, the execution control apparatus 101 is capable of executing such commands in parallel in units of servers, which allows it to reduce the time spent to build the system. When rebuilding of a system is again performed, the execution control apparatus 101 is capable of building the system by executing commands on servers Si according to the aggregated log PL generated when the system is rebuilt, correctly taking into account the dependency relationship between the servers in terms of the order of execution without explicit concert for it.

The execution control method described above with reference to embodiments may be realized by executing a prepared program (execution control program) on a computer such as a personal computer, a workstation, or the like. The execution control program may be stored in a computer-readable storage medium such as a hard disk, a flexible disk, a CD-ROM, an MO, a DVD, or the like. The execution control program may be read out from the storage medium and executed by a computer. The execution control program may be provided via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An execution control method performed by a processor in migrating a system including a first computer and a second computer to a target system including a third computer and a fourth computer, the execution control method comprising:
   executing a first plurality of commands in the first computer according to an execution order;
   executing a second plurality of commands in the second computer according to the execution order;
   storing configuration information of a migration source that includes one or more parameters generated by executing the first plurality of commands and the second plurality of commands in the system, the one or more parameters being used for executing unexecuted commands among the first plurality of commands and the second plurality of commands in the target system;
   executing a command among the first plurality of commands and the second plurality of commands in the target system;
   generating configuration information of a migrating destination that includes the one or more parameters generated by executing the command;
   selecting, by referring to the configuration information of the migrating source and the configuration information of the migrating destination, a command which is executable on the target system from a first earliest command that is at an earliest position in the first execution order among unexecuted commands of the first plurality of commands on the third computer and a second earliest command that is at an earliest position in the second execution order among unexecuted commands of the second plurality of commands on the fourth computer;
   executing the selected command on the target system; and
   updating the configuration information of the migrating destination based on a result of the executing of the selected command.

2. The execution control method according to claim 1, wherein the selecting includes:
   determining whether to execute the first earliest command based on the stored configuration information, wherein
      when the stored configuration information includes configuration information used to execute the first earliest command, said determining determines that the first earliest command is to be executed,
      when the stored configuration information does not include the configuration information used to execute the first earliest command, said determining determines that the first earliest command is not to be executed; and
   determining whether to execute the second earliest command based on the stored configuration information.

3. The execution control method according to claim 1, wherein the selecting includes, when an argument of the first earliest command is an argument associated with information that is input when the first command is executed, determining whether to execute the first earliest command.

4. The execution control method according to claim 3, wherein the selecting includes:
   referring to information indicating an identifier of a command in relation to an identifier of an argument associated with information that is input when the first earliest command is executed; and determining whether the first earliest command includes an argument associated with information that is input when the first earliest command is executed.

5. The execution control method according to claim 1, wherein the selecting includes:

determining whether a parameter used for executing the first earliest command exists in the configuration information of the migrating destination;

selecting the first earliest command when it is determined that the parameter exists in the configuration information of the migrating destination; and selecting the second earliest command when it is determined that the parameter does not exist in the configuration information of the migrating destination.

6. The execution control method according to claim 1, wherein the process further comprises, when the first earliest command is executed on the third computer, outputting an identifier of the third computer and information of the first earliest command which are associated with each other.

7. The execution control method according to claim 1, wherein the one or more parameters includes:

addresses of the first computer and the second computer, and paths of files and folders generated by executing the first plurality of commands and the second plurality of commands.

8. The execution control method according to claim 1, wherein the updating includes:

acquiring a parameter generated by executing the selected command, and storing the acquired parameter in the configuration information of the migrating destination.

9. A non-transitory computer-readable storage medium storing a program that causes a processor to execute a process to migrate a system including a first computer and a second computer to a target system including a third computer and a fourth computer, the process comprising:

executing a first plurality of commands in the first computer according to an execution order;

executing a second plurality of commands in the second computer according to the execution order;

storing configuration information of a migrating source that includes one or more parameters generated by executing the first plurality of commands and the second plurality of commands in the system, the one or more parameters being used for executing unexecuted commands among the first plurality of commands and the second plurality of commands in the target system;

executing a command among the first plurality of commands and the second plurality of commands in the target system;

generating configuration information of a migrating destination that includes the one or more parameters generated by executing the command;

selecting, by referring to the configuration information of the migrating source and the configuration information of the migrating destination, a command which is executable on the target system from a first earliest command that is at an earliest position in the first execution order among unexecuted commands of the first plurality of commands on the third computer and a second earliest command that is at an earliest position in the second execution order among unexecuted commands of the second plurality of commands on the fourth computer;

executing the selected command on the target system; and updating the configuration information of the migrating destination based on a result of the executing of the selected command.

10. An execution control apparatus to migrate a system including a first computer and a second computer to a target system including a third computer and a fourth computer, the execution control apparatus comprising:

a memory; and a processor coupled to the memory and configured to:

execute a first plurality of commands in the first computer according to an execution order, execute a second plurality of commands in the second computer according to the execution order, store configuration information of a migrating source that includes one or more parameters generated by executing the first plurality of commands and the second plurality of commands in the system, the one or more parameters being used for executing unexecuted commands among the first plurality of commands and the second plurality of commands in the target system;

execute a command among the first plurality of commands and the second plurality of commands in the target system;

generate configuration information of a migrating destination that includes the one or more parameters generated by executing the command;

select, by referring to the configuration information of the migrating source and the configuration information of the migrating destination, a command which is executable on the target system from a first earliest command that is at an earliest position in the first execution order among unexecuted commands of the first plurality of commands on the third computer and a second earliest command that is at an earliest position in the second execution order among unexecuted commands of the second plurality of commands on the fourth computer, execute the selected command on the target system; and update the configuration information of the migrating destination based on a result of the executing of the selected command.

* * * * *